(12) United States Patent
Miyashita et al.

(10) Patent No.: US 9,815,418 B2
(45) Date of Patent: Nov. 14, 2017

(54) LAMINATED COMPOSITE INTERIOR PART

(71) Applicants: Osamu Miyashita, Toyota (JP);
Kenichi Yoshida, Toyota (JP);
Masamori Hirose, Toyota (JP);
Hideaki Sakai, Toyota (JP)

(72) Inventors: Osamu Miyashita, Toyota (JP);
Kenichi Yoshida, Toyota (JP);
Masamori Hirose, Toyota (JP);
Hideaki Sakai, Toyota (JP)

(73) Assignee: Toyoda Iron Works Co., Ltd.,
Toyota-shi, Aichi (JP)

( * ) Notice: Subject to any disclaimer, the term of this patent is extended or adjusted under 35 U.S.C. 154(b) by 0 days.

(21) Appl. No.: 14/891,171

(22) PCT Filed: May 15, 2013

(86) PCT No.: PCT/JP2013/063571
§ 371 (c)(1),
(2) Date: Nov. 13, 2015

(87) PCT Pub. No.: WO2014/184903
PCT Pub. Date: Nov. 20, 2014

(65) Prior Publication Data
US 2016/0101743 A1    Apr. 14, 2016

(51) Int. Cl.
*B32B 3/30* (2006.01)
*B60R 13/02* (2006.01)
(Continued)

(52) U.S. Cl.
CPC ............... *B60R 13/02* (2013.01); *B32B 3/04* (2013.01); *B32B 3/30* (2013.01); *B32B 7/02* (2013.01);
(Continued)

(58) Field of Classification Search
CPC ............... B60R 13/02; B60R 13/0212; B60R 2021/0293; B60R 2021/0407;
(Continued)

(56) References Cited

U.S. PATENT DOCUMENTS

| 420,656 A | 2/1890 | Hayes |
| 3,137,602 A | 6/1964 | Lincoln |

(Continued)

FOREIGN PATENT DOCUMENTS

| CN | 101870275 A | 10/2010 |
| CN | 201613676 | 10/2010 |

(Continued)

OTHER PUBLICATIONS

Final Office Action issued in U.S. Appl. No. 14/383,164, dated Mar. 1, 2016.
(Continued)

*Primary Examiner* — Aaron Austin
*Assistant Examiner* — Megha Gaitonde
(74) *Attorney, Agent, or Firm* — Finnegan, Henderson, Farabow, Garrett & Dunner, LLP

(57) ABSTRACT

Numerous fine projections (20) are formed interspersed on a plate-shape member (18), and the neutral plane (S) of each fine projection (20) is inclined at an inclination angle α to the normal line (O) such that the contact center (Q) does not overlap with the base part in the plane direction of the surface (22), so when a pressing load (F) is applied, the moment acting on the fine projections (20) is large, and the fine projections (20) easily deform to bend in the respective inclination direction. By this means, the tactile softness (cushion properties) are improved by preventing the fine projections (20) from undergoing simple compression deformation in the axial direction, and stick-slip due to friction between the fine projections (20) and the surface (22) is (Continued)

avoided, making it possible to obtain a smooth and stable tactile softness.

8 Claims, 19 Drawing Sheets

(51) Int. Cl.
*B32B 27/06* (2006.01)
*B32B 3/04* (2006.01)
*B32B 7/02* (2006.01)

(52) U.S. Cl.
CPC .......... *B32B 27/06* (2013.01); *B32B 2307/51* (2013.01); *B32B 2605/00* (2013.01)

(58) Field of Classification Search
CPC ... B60R 2021/0442; B60R 21/04; B32B 3/10; B32B 3/12; B32B 3/14; B32B 3/16; B32B 3/18; B32B 7/04; B32B 7/12; B32B 7/005; B32B 7/045; B32B 27/06; A42B 3/064; A42B 3/121; A42B 3/125; A63B 71/10; Y10T 428/24174; Y10T 428/24496; Y10T 428/24504; A46B 9/02; A46B 9/025; A46B 9/04; A46B 9/06
USPC ........ 428/101, 105, 112, 114, 116, 156, 159, 428/163, 167, 169, 172, 174, 175, 178, 428/179, 195.1, 212, 213; 188/371–377; 2/411–425; 36/28.35 R, 37; 297/219.1–229, 452.48–452.62; 296/97.23, 153; 267/117, 119, 120, 267/142–146
See application file for complete search history.

(56) References Cited

U.S. PATENT DOCUMENTS

| | | | |
|---|---|---|---|
| 3,231,454 A | 1/1966 | Williams | |
| 3,419,457 A | 12/1968 | Bleasdale | |
| 3,834,487 A | 9/1974 | Hale | |
| 4,177,312 A | 12/1979 | Rasen et al. | |
| 4,252,590 A | 2/1981 | Rasen et al. | |
| 4,741,941 A | 5/1988 | Englebert et al. | |
| 4,995,408 A | 2/1991 | Wallschlaeger | |
| 5,030,501 A * | 7/1991 | Colvin | B32B 3/12 206/522 |
| 5,374,466 A | 12/1994 | Bleasdale | |
| 5,489,462 A | 2/1996 | Sieber | |
| 5,618,633 A | 4/1997 | Swanson et al. | |
| 5,620,712 A | 4/1997 | Nishino et al. | |
| 7,753,254 B2 | 7/2010 | Straza | |
| 8,734,932 B2 | 5/2014 | Keene | |
| 2001/0041248 A1 | 11/2001 | Matsushita et al. | |
| 2006/0059606 A1* | 3/2006 | Ferrara | A01N 25/18 2/412 |
| 2010/0264680 A1 | 10/2010 | Ishikawa | |
| 2011/0135862 A1 | 6/2011 | Sumi et al. | |
| 2011/0250384 A1 | 10/2011 | Sumi et al. | |
| 2011/0303355 A1 | 12/2011 | Sumi et al. | |

FOREIGN PATENT DOCUMENTS

| | | |
|---|---|---|
| EP | 2 243 658 A1 | 10/2010 |
| EP | 2 826 619 A1 | 1/2015 |
| EP | 2 926 986 A1 | 10/2015 |
| EP | 2 930 015 A1 | 10/2015 |
| JP | 56-151549 A | 11/1981 |
| JP | 62-129335 U | 8/1987 |
| JP | 02-093272 U | 7/1990 |
| JP | 3-80807 | 4/1991 |
| JP | 03-052139 U | 5/1991 |
| JP | 4-197624 | 7/1992 |
| JP | 4-225035 | 8/1992 |
| JP | 5-293906 | 11/1993 |
| JP | 6-71235 | 10/1994 |
| JP | 07-028632 U | 5/1995 |
| JP | 7-117596 | 5/1995 |
| JP | 7-228142 | 8/1995 |
| JP | 10-138377 | 5/1998 |
| JP | 10-140808 | 5/1998 |
| JP | 3069476 U | 3/2000 |
| JP | 2000-177488 | 6/2000 |
| JP | 2001-315268 | 11/2001 |
| JP | 2003-108676 | 4/2003 |
| JP | 2003-341405 | 12/2003 |
| JP | 2010-253967 | 11/2010 |
| WO | WO 2012/014166 A1 | 2/2012 |

OTHER PUBLICATIONS

Notification of Reason(s) for rejection JP Application No. 2014-503411, dated Aug. 5, 2014.
First Office Action dated Aug. 25, 2015, by SIPO of PRC in Chinese patent application No. 201280071180.1.
Office Action dated Sep. 21, 2015, of IPO of Taiwan, ROC in Taiwan patent application No. 102108047.
Extended European Search Report from the European Patent Office dated Dec. 2, 2015, in corresponding European Patent Application No. EP 12 870 500.1.
Office Action issued in Chinese patent application No. 201280071180.1 dated May 6, 2016.
Advisory Action issued in U.S. Appl. No. 14/383,164 dated Jun. 14, 2016.
Office Action issued in Chinese Application No. 201380076586.3 dated Jun. 23, 2016.
Office Action issued in European patent application No. 12870500.1 dated Oct. 14, 2016.
Office Action issued in Chinese patent application No. 201380076586.3 dated Jan. 23, 2017.
Search Report issued in European patent application No. 13884767.8 dated Feb. 13, 2017.
Notice of Allowance issued in U.S. Appl. No. 14/383,164 dated Jan. 31, 2017.
Office Action issued in Mexican patent application No. MX/a/2014/010715 dated Mar. 3, 2017.
Office Action issued in U.S. Appl. No. 15/360,182 dated Apr. 5, 2017.
Notice of Allowance and Notice of Allowability issued in U.S. Appl. No. 14/383,164 on May 17, 2017.
Office Action issued in Chinese patent application No. 201280071180.1 on Jul. 13, 2017.
Final Office Action issued in U.S. Appl. No. 15/360,182 dated Sep. 12, 2017.

* cited by examiner

FIG.9
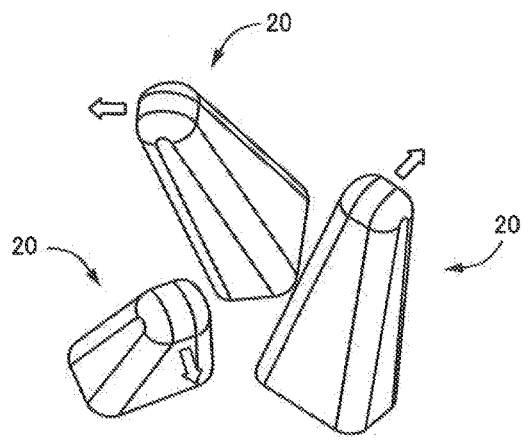
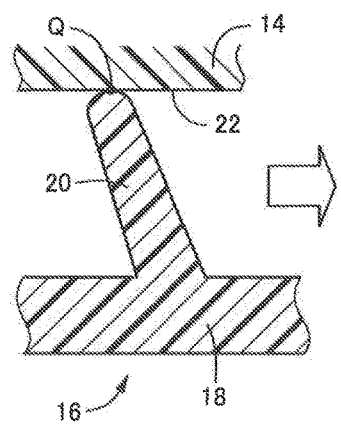
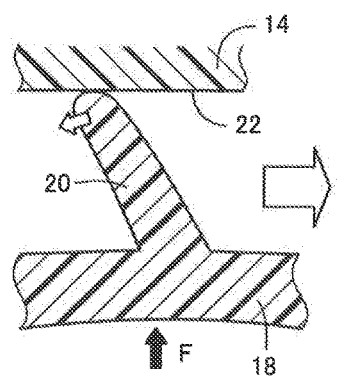
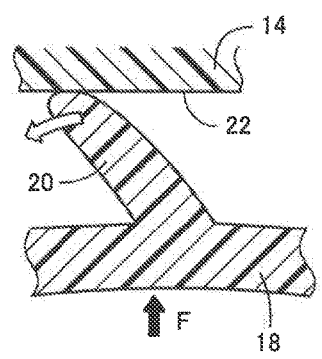
FIG.10A  FIG.10B  FIG.10C

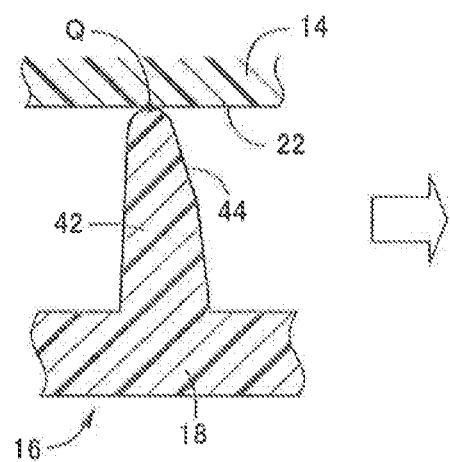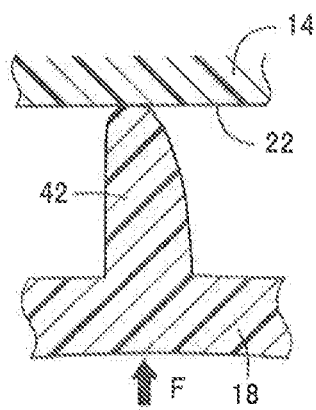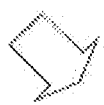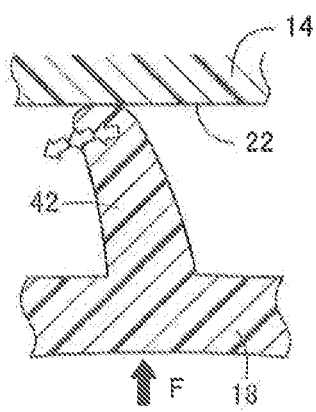

LAMINATED COMPOSITE INTERIOR PART

CROSS-REFERENCE TO RELATED APPLICATIONS

This application is a national phase application of International Application No. PCT/JP2013/063571, filed May 15, 2013, the content of which is incorporated herein by reference.

TECHNICAL FIELD

The present invention relates to a laminated composite interior part, and more particularly to a technique of further improving a tactile feel of the laminated composite interior part having cushioning properties due to elastic deformation of a multiplicity of protrusions.

BACKGROUND ART

There is known a laminated composite interior part which includes (a) a first member having a predetermined mating surface, and (b) a second member which is made of an elastically deformable resin material, and which has a plate portion substantially parallel to the mating surface and provided with a multiplicity of protrusions which are formed integrally therewith and which protrude toward the mating surface such that the plate portion and the mating surface cooperate to define a space between the plate portion and the mating surface. The second member is placed on the first member with the protrusions being in contact with the mating surface. The laminated composite interior part has (c) cushioning properties provided by elastic deformation of the protrusions, which is to be caused as distal ends of the protrusions are pressed against the mating surface. A part described in Patent Document 1 (see especially FIG. 13) is an example of such a laminated composite interior part, and relates to an interior part (armrest etc.) for vehicles. Patent Document 1 describes a technique of providing a multiplicity of pin-shaped protrusions on the back surface of a surface member serving as the second member to improve the tactile feel (soft feel) of the surface member by elastic deformation of the protrusions. Patent Document 1 also describes a technique of providing long plate-shaped ribs instead of the pin-shaped protrusions.

RELATED ART DOCUMENTS

Patent Documents

Patent Document 1: Japanese Patent Application Publication No. 2003-103676

SUMMARY OF THE INVENTION

Problems to be Solved by the Invention

In such a conventional laminated composite interior part, simple columnar protrusions are provided so as to be pressed substantially perpendicularly against the mating surface. Accordingly, the deformation manner (the bending direction etc.) in which the protrusions are elastically deformed by a pressing load is not stable, which tends to cause variation in the tactile feel. Moreover, the protrusions are merely compressively deformed in the axial direction by the pressing load, which may not provide sufficient cushioning properties (soft feel). Providing the ribs instead of the multiplicity of protrusions increases rigidity and is less likely to provide a sufficient soft feel.

The present invention was developed in view of the above circumstances, and it is an object of the present invention to further improve the tactile feel of a laminated composite interior part that has cushioning properties due to elastic deformation of a multiplicity of protrusions.

The above object may be achieved according to any one of first through ninth aspects of the invention. The first aspect of the invention provides a laminated composite interior part comprising: (a) a first member having a predetermined mating surface; and (b) a second member which is made of an elastically deformable resin material, and which has a plate portion substantially parallel to the mating surface, the plate portion being provided with a multiplicity of protrusions which are formed integrally with the plate portion and which protrude toward the mating surface such that the plate portion and the mating surface cooperate to define a space between the plate portion and the mating surface, the second member being placed on the first member with the protrusions being in contact with the mating surface, (c) the laminated composite interior part having cushioning properties and thus a predetermined tactile feel provided by elastic deformation of the protrusions, which is to be caused as distal ends of the protrusions are pressed against the mating surface, the laminated composite interior part characterized in that (d) the multiplicity of protrusions are identical with one another in shape, a base end portion of each of the protrusions and a center of contact between the each of the protrusions and the mating surface are offset from each other so as not to overlap each other in a planar direction of the mating surface, each of the protrusions is flexurally deformed in a given direction about an axis that is determined by a positional relationship between the base end portion of the each of the protrusions and the center of the contact, and the multiplicity of protrusions are interspersed on the plate portion so as to be arranged at predetermined intervals depending on the height of the protrusions so that the protrusions do not interfere with each other when flexurally deformed, and (e) the multiplicity of protrusions are positioned on sides of a multiplicity of polygons having the same in shape and size that cooperate to form a grid pattern in which each adjacent pair of the polygons have a common side that is common to the each adjacent pair of the polygons.

The center of contact means the center of range of the contact between the protrusion and the mating surface in an initial state.

According to the second aspect of the invention, in the laminated composite interior part defined in the first aspect of the invention, it is characterized in that a centerline of each of the protrusions is tilted, at least at a distal end portion of the each of the protrusions which is in contact with the mating surface, with respect to a normal direction normal to the plate portion in the base end portion of the each of the protrusions.

The centerline of the protrusion is a line connecting, in an axial direction (protruding direction) of the protrusion, central points (centers of gravity) on respective transverse sections of the protrusion which are parallel to the plate portion having the protrusion formed thereon.

According to the third aspect of the invention, in the laminated composite interior part defined in the second aspect of the invention, it is characterized in that characterized in that (a) each of the protrusions has a plate shape with an elongated shape in a transverse section thereof parallel to the plate portion, and (b) a neutral plane, which is defined within each of the protrusions in a thickness direction of the plate shape, is tilted with respect to the normal direction along an entire length from the base end portion to the distal end portion of the each of the protrusions.

The neutral plane in the thickness direction is a plane connecting, in the axial direction of the protrusion, neutral lines bisecting the thickness of the protrusion in the transverse sections thereof which are parallel to the plate portion. The neutral plane contains the centerline of the protrusion of the second aspect of the invention.

According to the fourth aspect of the invention, in the laminated composite interior part defined in any one of the first through third aspects of the invention, it is characterized in that (a) the grid pattern is a succession of the polygons which are quadrilaterals or hexagons and which are identical with one another, and (b) each of the protrusions is positioned on a corresponding one of the sides of a corresponding one of the polygons in an attitude that causes the each of the protrusions to be bent inward or outward of the corresponding one of the polygons, such that the protrusions that are positioned on the respective sides of each of the polygons are bent in opposite directions alternately in a circumferential direction about a centerline of the each of the polygons.

According to the fifth aspect of the invention, in the laminated composite interior part defined in any one of the first through fourth aspects of the invention, it is characterized in that the grid pattern is a honeycomb pattern that is a succession of the polygons in the form of regular hexagons having a given size.

According to the sixth aspect of the invention, in the laminated composite interior part defined in any one of the first through fifth aspects of the invention, it is characterized in that (a) the laminated composite interior part is a plate-shaped panel part, (b) the second member is a surface layer member, (c) the first member is a plate-shaped base member made of a resin material harder than that of the surface layer member, and (d) a front surface of the base member serves as the mating surface, and the surface layer member is placed on the front surface and is fixedly attached to the base member.

According to the seventh aspect of the invention, in the laminated composite interior part defined in the sixth aspect of the invention, it is characterized in that a surface member is firmly fixed to a front surface as one of opposite surfaces of the surface layer member, which is remote from the fine protrusions that are provided on the plate portion, so that the laminated composite interior part includes the surface member, the surface layer member and the plate-shaped base member, and constitutes a three-layer structure as a whole.

According to the eighth aspect of the invention, in the laminated composite interior part defined in any one of the first through fifth aspects of the invention, it is characterized in that (a) the laminated composite interior part is a plate-shaped panel part, (b) the first member is a plate-shaped surface layer member made of an elastically deformable resin material, and (c) the second member is firmly fixed to a plate-shaped base member such that a back surface as one of opposite surfaces of the second member, which is remote from the fine protrusions that are provided on the plate portion, is in close contact with the base member.

Effects of the Invention

In the laminated composite interior part, the multiplicity of protrusions are interspersed on the plate portion, and a base end portion of each of the protrusions and a center of contact between the each of the protrusions and the mating surface are offset from each other so as not to overlap each other in a planar direction of the mating surface. This offset between the contact center and the base end portion increases the moment that is applied to the protrusion when a pressing load is applied, whereby each fine protrusion is easily flexurally deformed in a given direction about art axis that is determined by a positional relationship between the base end portion and the center of the contact. This suppresses simple compressive deformation of the protrusions in the axial direction and improves the soft feel (cushioning properties) and also suppresses stick-slip that is caused by the friction between the fine protrusions and tire mating surface, thereby providing a smooth, stable soft feel. Further, the bending (buckling) direction of each protrusion can be controlled, and the deformation manner (the bending direction etc.) in which each protrusion is elastically deformed is stable. This suppresses variation in tactile feel at the time the plate portion is pressed with a finger or a hand.

In the present invention, the multiplicity of protrusions that are formed to be interspersed on the plate portion are arranged at predetermined intervals depending on the height of the protrusions so that the protrusions do not interfere with each other when flexurally deformed. This can reliably provide a soft feel by flexural deformation of the protrusions. Moreover, the multiplicity of protrusions are positioned on sides of a multiplicity of polygons that cooperate to form a grid pattern in which each adjacent pair of the polygons have a common side that is common to the each adjacent pair of the polygons, so that the multiplicity of protrusions are arranged in a given arrangement pattern, which suppresses variation in tactile feel at the time the plate portion is pressed with a finger or a hand. Where the attitudes of the protrusions are changed to correspond to the sides in the grid pattern, the bending directions of the protrusions are made different accordingly, so that the protrusions support each other, providing an appropriate rigid feel (not too-soft feel). This rigid feel together with the soft feel provided by elastic deformation of the protrusions can provide a further improved tactile feel.

In the second aspect of the invention, each of the protrusions is tilted, at a distal end portion of the each of the protrusions which is in contact with the mating surface, with respect to a normal direction normal to the plate portion in the base end portion of the each of the protrusions, so that the distal end portion of the each of the protrusions contacts the mating surface that is substantially parallel to the plate portion, in a tilted attitude. This more reliably facilitates flexural deformation of each of the protrusions in a given direction that is determined depending on the tilt direction, providing a smoother, more stable soft feel and suppressing variation in tactile feel at the time the plate portion is pressed with a finger or a hand. Particularly, in the third aspect of the invention in which each of the protrusions has a plate shape and is tilted in a thickness direction of the plate shape, the deformation manner in which the each of the protrusions is elastically deformed is more stable, and the above effect can be further suitably obtained.

In the fourth aspect of the invention, the multiplicity of protrusions are identical with one another in shape, and each of the protrusions is flexurally deformed in a given direction about an axis, the grid pattern is a succession of the polygons which are quadrilaterals or hexagons and which are identical with one another, and each of the protrusions is positioned on a corresponding one of the sides of a corresponding one of the polygons in an attitude that causes the each of the protrusions to be bent inward or outward of the corresponding one of the polygons, such that the protrusions that are positioned on the respective sides of each of the polygons are bent in opposite directions alternately in a circumferential direction about a centerline of the each of the polygons. Despite that the protrusions are flexurally deformed in the given directions, the deformation manner of the protrusions of each polygon is substantially the same in the entire area, whereby a uniform tactile feel can be provided.

In the fifth aspect of the invention, the grid pattern, which is defined by the multiplicity of protrusions, is a honeycomb pattern that is a succession of the polygons in the form of regular hexagons having a given size. For example, where the attitudes of the protrusions are shifted from each other by 60° or 120° so as to correspond to the sides of the hexagons, it is possible to suppress anisotropy of elastic deformation that is caused by the pressing load, and to provide a relatively uniform tactile feel even if the pressing load is applied in an oblique direction.

In the sixth aspect of the invention, the laminated composite interior part is a plate-shaped panel part, the second member is a surface layer member, the first member is a plate-shaped base member made of a resin material harder than that of the second member, and the surface layer member is placed on the front surface of the base member and is fixedly attached to the base member. In this panel part, it is possible to suitably obtain the effects of the first through fifth aspects of the invention. For example, when the plate portion of the surface layer member is pressed with a finger or a hand, the protrusions provided on the surface layer member are elastically deformed whereby an excellent tactile feel is provided. Further, where the panel part has a two-layer structure constituted by only the first and second members, such a simple structure can be manufactured at low cost.

In the seventh aspect of the invention, a surface member is firmly fixed to the surface layer member of the panel part according to the sixth aspect of the invention. Since the surface member covers one of opposite surfaces of the surface layer member, which is remote from the protrusions provided on the plate portion, even if sink marks, flashing, etc. are caused in the plate portion due to formation of the protrusions, they are not exposed to the outside, and scratches on the surface layer member are prevented. This expands the choice of resin materials for the surface layer member and increases flexibility in design such as the shape of the protrusions etc. which relates to the tactile feel. The tactile feel can thus be adjusted more easily and appropriately.

In the eighth aspect of the invention, the laminated composite interior part is a plate-shaped panel part, the first member is a plate-shaped surface layer member made of an elastically deformable resin material, and the second member is firmly fixed to a plate-shaped base member such that a back surface as one of opposite surfaces of the second member, which is remote from the fine protrusions that are provided on the plate portion, is in close contact with the base member. In this panel part, when the surface layer member (the first member) is pressed with a finger or a hand, the back surface (the mating surface) of the surface layer member is pressed against the distal ends of the protrusions provided on the second member whereby the protrusions are elastically deformed, providing an excellent tactile feel. Thus, it is possible to suitably obtain the effects of the first through fifth aspects of the invention. Further, since the second member having the protrusions is covered by the surface layer member (the first member) and the plate portion of the second member is fixed to the base member, sink marks, flashing, etc., if any, on a surface of the plate portion, which is remote from the protrusions are not exposed to the outside. This expands the choice of resin materials for the second member and increases flexibility in design such as the shape of the protrusions etc. which relates to the tactile feel. The tactile feel can thus be adjusted more easily and appropriately.

BRIEF DESCRIPTION OF THE DRAWINGS

FIGS. 6A and 6B are views for explaining the multiplicity of fine protrusions provided on the back surface of the surface layer member, wherein FIG. 6A is a plan view showing the fine protrusions in a size close to their actual size, and FIG. 6B is an enlarged plan view showing a portion VIb in FIG. 6A.

FIG. 9 is a perspective view of the fine protrusions shown in FIG. 6 wherein white arrows indicate bending directions of the protrusions.

FIGS. 10A, 10B and 10C are longitudinal sectional views corresponding to FIG. 7, and a set of views for explaining a manner in which the fine protrusion is to be deformed when the surface layer member is pressed by a pressing load F.

FIGS. 35A, 35B and 35C are longitudinal sectional views corresponding to FIG. 17 and is a set of views for explaining a manner of deformation of the perpendicular fine protrusion with the greatly tilted surface of FIGS. 16-18 when the protrusion is pressed against the base member by the pressing load F.

MODES FOR CARRYING OUT THE INVENTION

Figure 1:
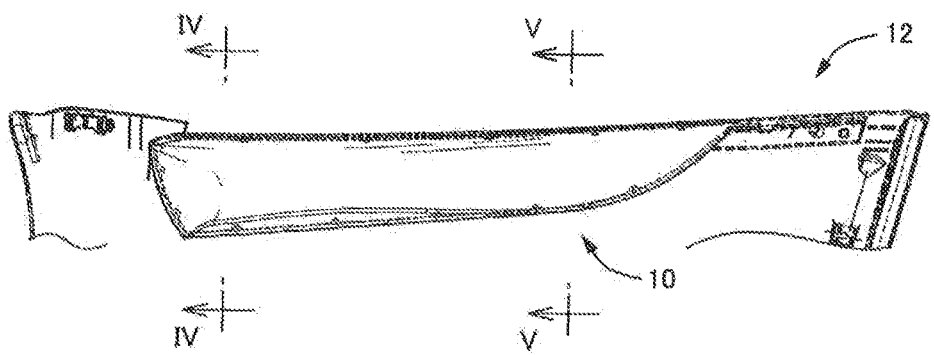
FIG. 1 is a schematic view showing an upper end portion of a vehicle door trim having an ornament as an embodiment of the invention, as viewed from a design surface side (from an interior side of the vehicle).

The present invention is applied to vehicle interior parts such as a door trim, a luggage side trim, and an instrument panel, and ornaments etc. that are attached to the interior parts, bus is also applicable to panel parts for applications other than vehicle applications. The present invention is applicable not only to plate-shaped panel parts but also to three-dimensional parts in which the second member is placed on the surface of the first member or the base member that is curved three-dimensionally to have a three-dimensional shape. In the case of using the first member as the base member, relatively hard synthetic resin materials are preferably used such as rigid polyvinyl chloride, polypropylene, polyethylene and ABS. However, the first member may be made of other materials such as a metal. In the case of using the first member as the surface layer member, or for the resin material of the second member, various thermoplastic resins are preferably used such as soft polyvinyl chloride, styrene resin, olefin resin, and polyester resin. Not only various resin materials such as soft polyvinyl chloride, styrene resin, olefin resin, and polyester resin but also various surface materials such as woven fabric, nonwoven fabric, knitted fabric, vinyl chloride, a flexible film can be used as the surface member.

The base end portion of the protrusion and the center of contact between the protrusion and the mating surface are offset from each other so as not to overlap each other in the planar direction of the mating surface. This means that in the case where the base end portion of the protrusion is projected perpendicularly onto the mating surface, the center of contact is not located in the projection range of the base end portion. In the initial state before the protrusion is elastically deformed by the pressing load, it is only necessary that at least the center of contact do not overlap the base end portion, and the contact region between the distal end portion of the protrusion and the mating surface may partially overlap the base end portion. It is desirable that the distal end portion of the protrusion have the shape of a smooth convex surface such as the shape of a partial sphere or the shape of a partial cylinder so that the distal end portion of the protrusion can appropriately slide on the mating surface.

The protrusion may be in various forms having a circular shape, an elliptical shape, a semicircular shape, a polygonal shape such as a triangular or quadrilateral shape, and a trapezoidal shape in its transverse section parallel to the plate portion. For example, the protrusion is disposed in such an attitude that the centerline of the protrusion is tilted along the length from the base end portion to the distal end of the protrusion by a given tilt angle α with respect to the direction normal to the plate portion. The tilt angle α may be varied continuously or stepwise. The protrusion may include a perpendicular portion parallel to the normal direction. For example, the base end portion of the protrusion may be parallel to the normal direction and only the distal end portion of the protrusion may be tilted with respect to the normal direction. An appropriate range of the tilt angle α of the protrusion is, e.g., $10° \leq α \leq 30°$, and a desirable range of the tilt angle α is 15° to 25°. Increasing the tilt angle α degrades mold release properties due to undercuts, and decreasing the tilt angle α makes it difficult to achieve the effect of the present invention, namely to cause smooth, stable flexural deformation of the protrusion.

It is desirable that the protrusion have a tapered shape such that its sectional area decreases as it goes toward the distal end. An appropriate range of the height dimension H of the protrusion is, e.g., about 2 mm≤H≤4 mm. In the case where the protrusion has a plate shape with an elongated shape in its transverse section, an appropriate range of the lateral dimension L (the longitudinal dimension of the transverse section having the elongated shape) of the protrusion is, e.g., about 1.5 mm≤L≤2.5 mm, and an appropriate range of the thickness dimension d of the protrusion is, e.g., about 1 mm≤d≤2 mm. An appropriate elongated shape of the transverse section of the protrusion having the plate shape is, e.g., an oblong rectangle with four rounded corners or an elongated circle having an arc shape at both ends in the longitudinal direction. However, the elongated shape of the transverse section of the protrusion having the plate shape may be other elongated shapes such as a curved shape.

For example, the grid pattern in which the protrusions are arranged is a succession of the same (same in shape and size) equilateral triangles, squares, or regular hexagons as the polygons. However, this grid pattern may be a succession of oblong rectangles, rhombuses, parallelograms, scalene triangles, hexagons with unequal sides, etc.

It is desirable that the protrusions be arranged one by one on each side of the polygons of the grid pattern. However, two or more protrusions may be positioned on each side of the polygons. In the case where the polygon is an oblong rectangle or parallelogram whose long and short sides have different lengths, the number of protrusions positioned on the long side and the number of protrusions positioned on the short side may be different from each other. For example, the protrusions having the elongated shape in transverse section are disposed in such an attitude that the longitudinal directions of their transverse sections are parallel to the sides of the polygons. However, the protrusions may be disposed in such an attitude that the longitudinal directions of their transverse sections are perpendicular to the sides of the polygons, or may be disposed in such a tilted attitude that the longitudinal directions of their transverse sections are tilted at a predetermined angle with respect to the sides of the polygons. The protrusions may be disposed such that the longitudinal directions of their transverse sections having the elongated shape are either parallel or perpendicular to the sides of the polygons depending on the positions of the protrusions in the grid pattern.

The grid pattern of the fifth invention is a honeycomb pattern that is a succession of regular hexagons. An appropriate range of a pitch P between mutually parallel two sides of each regular hexagon (the distance between the centers of the respective protrusions provided on these two sides) is 3.5 mm≤P≤7.5 mm, and is desirably 4 mm≤P≤7 mm. When P<3.5 mm, the protrusions are small, which degrade moldability. When P>7.5 mm, the difference in reaction force clue to the presence and absence of the protrusions (the difference in reaction force between the position where the protrusion is located and the intermediate position between the protrusions) is large, which provides a strange tactile feel, although it depends on the material and the thickness of the plate portion.

In the eighth invention, the first member is the surface layer member, and the second member is firmly fixed to the plate-shaped base member. The laminated composite interior part thus has an at least three-layer structure including the base member. However, the surface member may be provided on the surface layer member so that the laminated composite interior part has a four-layer structure.

Embodiments

Embodiments of the present invention will be described in detail below with reference to the accompanying drawings.

Figure 2:
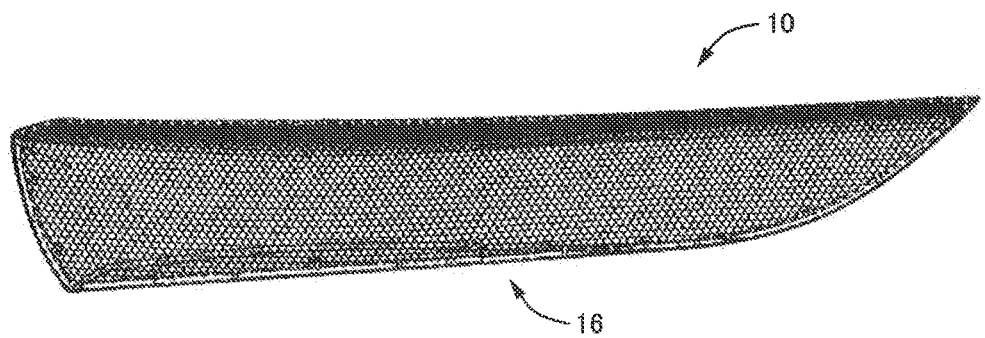
FIG. 2 is a view showing only the ornament of the vehicle door trim of FIG. 1, and transparently showing a multiplicity of fine protrusions provided on a back surface of a surface layer member, as viewed from the design surface side.
Figure 3:
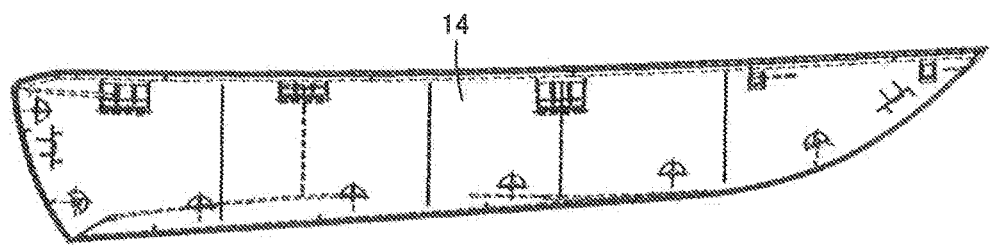
FIG. 3 is a view showing a base member of the ornament of FIG. 2, with the surface layer member being removed therefrom.
Figure 4:
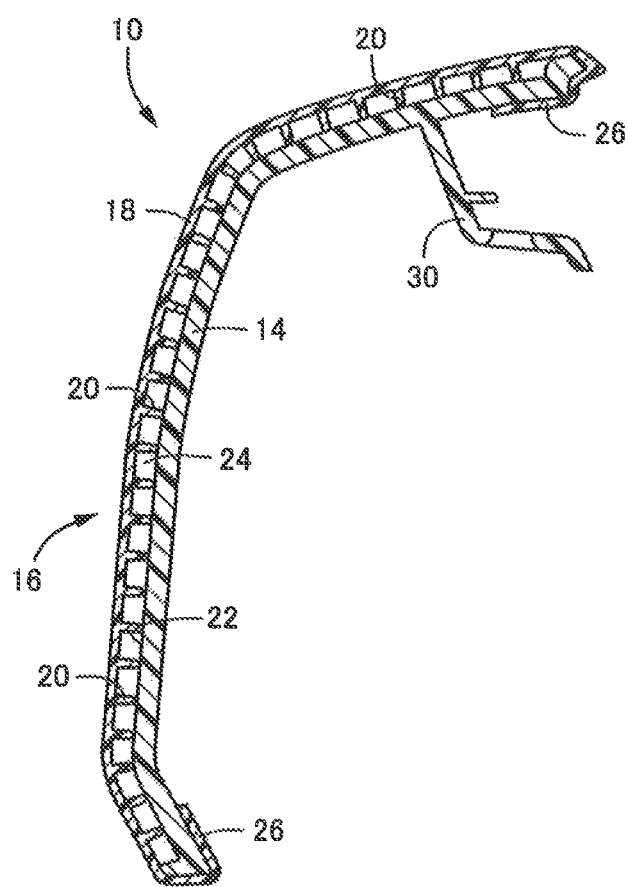
FIG. 4 is an enlarged sectional view taken along line IV-IV and viewed in the direction of arrows IV-IV in FIG. 1.
Figure 5:
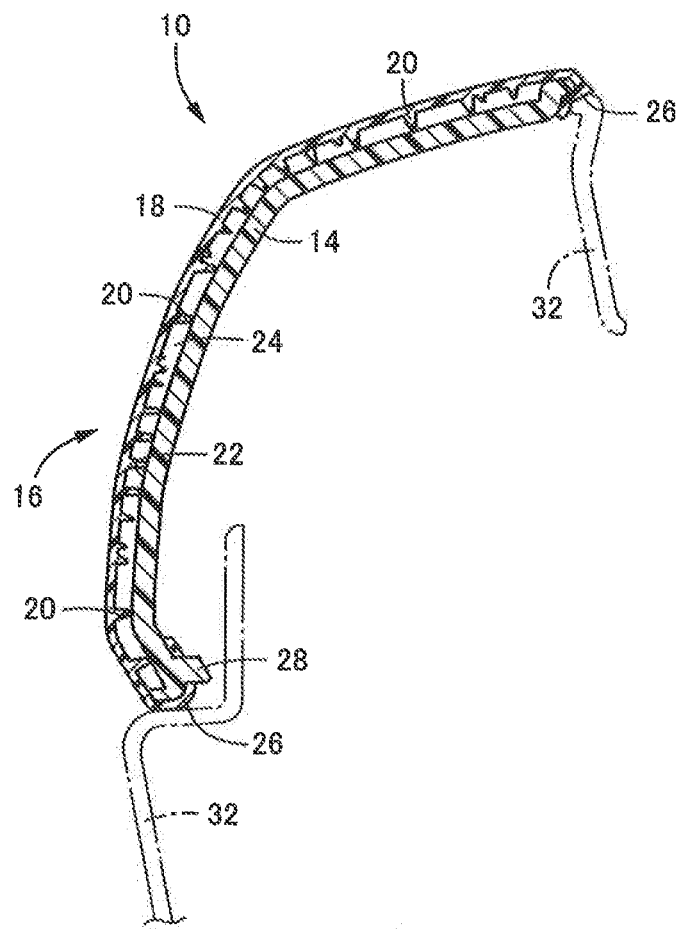
FIG. 5 is an enlarged sectional view taken along line V-V and viewed in the direction of arrows V-V in FIG. 1.

FIG. 1 is a schematic front view showing a shoulder portion (a lower end portion of a window) at the upper end portion of a vehicle door trim 12 having an ornament 10 to which the present invention is applied, as viewed from the design surface side, namely from the interior side, of a right door of a vehicle. FIG. 2 is a view showing only the ornament 10 of FIG. 1, and transparently showing a multiplicity of fine protrusions 20 (see FIG. 6 etc.) formed on the back surface of a surface layer member 16, as viewed from the design surface side. FIG. 3 is a view showing a base member 14 of the ornament 10 with the surface layer member 16 being removed therefrom. FIG. 4 is a sectional view of the ornament 10 taken along line IV-IV and viewed in the direction of arrows IV-IV in FIG. 1. FIG. 5 is a sectional view of the ornament 10 taken along line V-V and viewed in the direction of arrows V-V in FIG. 1.

The ornament 10 is a laminated composite interior part formed by the plate-shaped base member 14 and the surface layer member 16 superposed on a front surface 22 of the base member 14 so as to be substantially parallel to the front surface 22. The ornament 10 corresponds to a plate-shaped panel, and the front surface 22 of the base member 14 corresponds to the mating surface. The surface layer member 16 is the second member and is molded as a single-piece member with a relatively soft, elastically deformable synthetic resin material such as soft polyvinyl chloride. The surface layer member 16 has a plate portion 18 substantially parallel to the front surface 22, and the multiplicity of fine protrusions 20 that protrude toward the front surface 22 of the base member 14 are formed integrally with the plate portion 18 on the back surface of the plate portion 18. These fine protrusions 20 provide space 24 between the plate portion 18 and the front surface 22. An outer peripheral terminal portion 26 of the plate portion 18 wraps an outer peripheral edge portion of the base member 14 with the distal ends of the fine protrusions 20 being in close contact with the front surface 22, whereby the surface layer member 16 is fixedly attached to the base member 14. The fine protrusions 20 correspond to the protrusions.

The base member 14 corresponds to the first member, and is molded as a single-piece member with a synthetic resin material such as polypropylene, which is harder than the surface layer member 16. The terminal portion 26 is latched and held by a plurality of latch protrusions 28 formed on an outer peripheral edge portion of the back surface of the base member 14. A plurality of attachment engagement portions 30 are also formed integrally with the base member 14 on the back surface of the base member 14, and the base member 14 is fixedly attached to the vehicle door trim 12 via the attachment engagement portions 30. With the ornament 10 thus being fixedly attached to the vehicle door trim 12 via the attachment engagement portions 30, the terminal portion 26 is pressed against the outer peripheral edge portion of the base member 14 by a plurality of holding portions 32 of the vehicle door trim 12, so that the terminal portion 26 is held on the outer peripheral edge portion, wrapping the outer peripheral edge portion. The terminal portion 26 may be fixed to a peripheral edge portion of the base member 14 by other fixing means such as an adhesive.

Figure 6A:
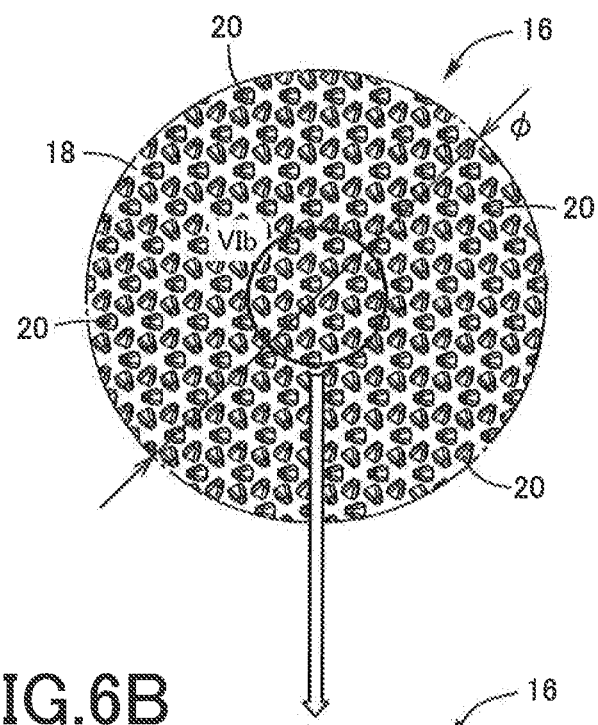
Figure 6B:
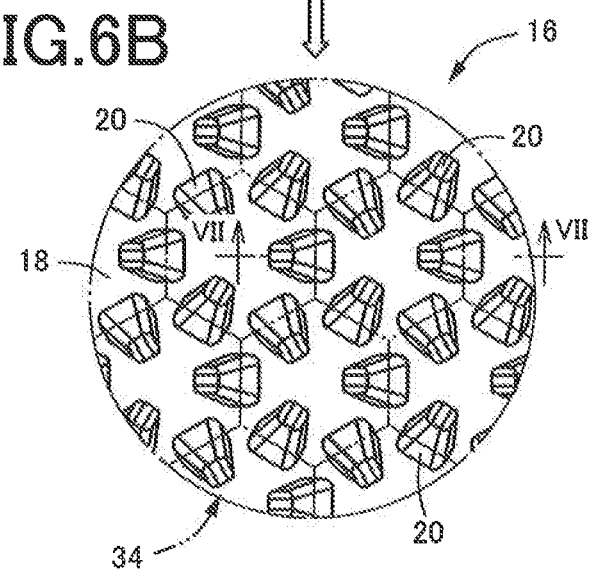
Figure 7:
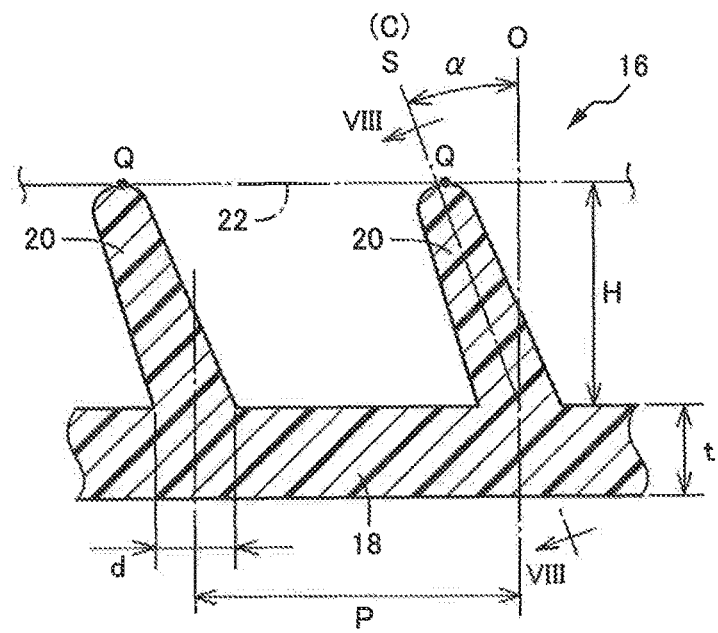
FIG. 7 is an enlarged longitudinal section taken along line VII-VII and viewed in the direction of arrows VII-VII in FIG. 6B.
Figure 8:
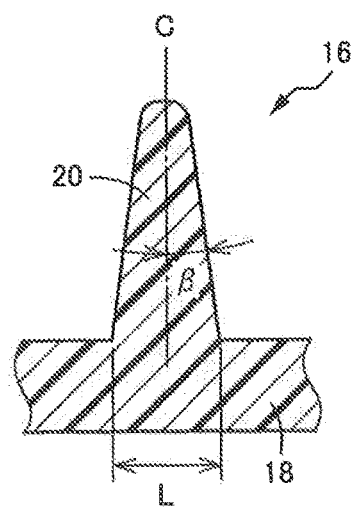
FIG. 8 is a longitudinal section taken along line VIII-VIII and viewed in the direction of arrows VIII-VIII in FIG. 7.

FIG. 6 shows illustrations of the multiplicity of fine protrusions 20 formed on the back surface of the surface layer member 16. FIG. 6A is a plan view showing the fine protrusions 20 in a size close to their actual size (diameter ϕ=50 mm), and FIG. 6B is an enlarged plan view showing a portion VIb as a central part of FIG. 6A. These plan views show the fine protrusions 20 as viewed in a direction perpendicular to the plate portion 18. FIG. 7 is an enlarged longitudinal section taken along line VII-VII and viewed in the direction of arrows VII-VII in FIG. 6B, namely a sectional view along the thickness direction of the fine protrusions 20. FIG. 8 is a longitudinal section taken along line VIII-VIII and viewed in the direction of arrows VIII-VIII in FIG. 7, namely a sectional view along the lateral direction of the fine protrusion 20, taken along a neutral plane S along the tilt of the fine protrusion 20. FIG. 9 is a perspective view of the plurality of fine protrusions 20 as viewed obliquely from above. As can be seen from these figures, the multiplicity of fine protrusions 20 have the same shape, and have an elongated shape in its transverse section parallel to the plate portion 18. The multiplicity of fine protrusions 20 are arranged in a grid pattern 34 of a multiplicity of polygons in which each adjacent pair of the polygons have a common side that is common to the pair of the polygons, and are positioned in respective positions defining the respective sides of the polygons. The multiplicity of fine protrusions 20 are disposed in such an attitude that the longitudinal direction of the transverse section of each fine protrusion 20 is substantially parallel to a corresponding one of the sides of the polygons. In the present embodiment, the fine protrusions 20 have an oblong rectangular shape with four rounded corners in their transverse section, and are disposed in such an attitude that the longitudinal direction of the oblong rectangular transverse section of each fine protrusion 20 matches a corresponding one of the sides of the polygons. As shown by long dashed double-short dashed lines in FIG. 6B, the grid pattern 34 is a honeycomb pattern that is a succession of the polygons in the form of regular hexagons of a given size, and the fine protrusions 20 are arranged one by one in the middle of each side of the regular hexagons.

Each of the fine protrusions 20 has a plate shape with a substantially oblong rectangular transverse section, and has a gently tapered shape such that its sectional area decreases closer to the distal end. As can be seen from FIG. 7, the neutral plane S in the thickness direction of the plate shape is tilted along the entire length from the base end portion to the distal end portion of the fine protrusion 20 by a tilt angle α with respect to a direction O normal to the plate portion 18 in the base end portion of the fine protrusion 20. The neutral plane S is a plane connecting, in the axial direction of the fine protrusion 20, neutral lines bisecting the thickness of the fine protrusion 20 in the transverse sections thereof which are parallel to the plate portion 18. The neutral plane S contains a centerline C connecting, in the axial direction of the fine protrusion 20, the central points (centers of gravity) of the transverse sections of the fine protrusion 20 which are parallel to the plate portion 18. The plate portion 18 is substantially parallel to the front surface 22 of the base member 14. Accordingly, in a relatively small region near the individual fine protrusion 20, the direction O normal to the plate portion 18 substantially matches a direction normal to the front surface 22. The distal end portion of the fine protrusion 20 thus contacts the front surface 22 in an attitude tilted at substantially the same angle as the tilt angle α. The tilt angle α is 5°≤α≤25° and is set to, e.g., about 20°. Due to this tilt, the center Q of contact between the fine protrusion 20 and the front surface 22 is offset from the base end portion of the fine protrusion 20 so as not to overlap the base end portion of the fine protrusion 20 in the planar direction of the front surface 22. In other words, in the case where the base end portion of the fine protrusion 20 is projected perpendicularly onto the front surface 22, the center Q of the contact is not located in the projection range of the base end portion. The center Q of the contact is the central position of the range of the contact between the fine protrusion 20 and the front surface 22 in an initial state where the surface layer member 16 is fixedly attached to the base member 14 as shown in FIGS. 4 and 5, and is determined by the tilt angle α, the height dimension H of the fine protrusion 20, the shape of the distal end portion of the fine protrusion 20, etc. The distal end portion of the fine protrusion 20 having the plate shape has the shape of a partial cylinder smoothly curved to define an arc shape in the longitudinal section along the thickness direction in FIG. 7, and is smoothly rounded at both end portions in the longitudinal section along the lateral direction in FIG. 8. This allows the distal end portion of the fine protrusion 20 to smoothly slide on the front surface 22.

The fine protrusions 20 will be more specifically described. A pitch P as an interval between mutually parallel two sides of each regular hexagon of the grid pattern 34, namely the distance between the centers of the respective fine protrusions 20 provided on these two sides, is 4 mm≤P≤7 mm, and in the present embodiment, about 5 mm. The height dimension H of the fine protrusion 20 is 2 mm≤H≤4.0 mm, and in the present embodiment, about 3.5 mm. The thickness dimension d of the fine protrusion 20 having the plate shape with an oblong rectangular section is 1 mm≤d≤2 mm, and in the present embodiment, about 1.2 mm. The lateral dimension L (the longitudinal dimension of the oblong rectangular transverse section) of the fine protrusion 20 is 1.5 mm≤L≤2.5 mm and is larger than the thickness dimension d. In the present embodiment, the lateral dimension L is about 1.8 mm. A tilt angle β of both side surfaces in the lateral direction (the longitudinal direction of the oblong rectangular transverse section) of the fine protrusion 20 with respect to the protruding direction of the fine protrusion 20 is 5°≤β≤15°, and in the present embodiment, about 7° to 8°. The fine protrusion 20 is symmetrical about the centerline C. The thickness t of the plate portion 18 is 1 mm≤t≤2 mm, and in the present embodiment, about 1.5 mm. These dimensions and angles are decided as appropriate in view of the material of the surface layer member 16 etc. so as to provide a predetermined tactile feel (soft feel, rigid feel, etc.), strength, etc.

When the plate portion 18 of the surface layer member 16 of such an ornament 10 is pressed with a finger or a hand, the distal ends of the fine protrusions 20 are pressed against the front surface 22 of the base member 14 and elastically deformed so as to buckle. This elastic deformation provides cushioning properties and thus a predetermined tactile feel. In the present embodiment, the neutral plane S of each fine protrusion 20 is tilted at the tilt angle α with respect to the normal direction O so that the contact center Q does not overlap the base end portion in the planar direction of the front surface 22. This offset between the contact center Q and the base end portion increases the moment that is applied to the fine protrusion 20 when a pressing load is applied, whereby the distal end portion of the fine protrusion 20 smoothly slides on the front surface 22 and is flexurally deformed. That is, when a pressing load F is applied to the plate portion 18 in a direction substantially perpendicular thereto, each fine protrusion 20 is smoothly flexurally deformed in a given direction about its axis that is determined by the positional relationship between the base end portion and the contact center Q, specifically in the tilt direction, as sequentially shown by FIGS. 10A, 10B and 10C. This improves the soft feel (cushioning properties) and also suppresses stick-slip that is caused by the friction between the front surface 22 and the fine protrusions 20 etc., thereby providing a smooth, stable soft feel. White arrows in FIG. 9 represent the flexural deformation direction, i.e., the tilt direction, of each fine protrusion 20.

Figure 16:
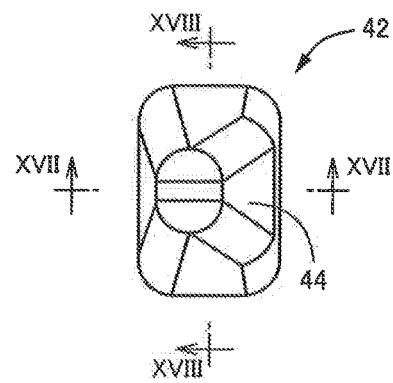
FIG. 16 is a plan view showing a perpendicular fine protrusion with a greatly tilted surface as a comparative product, which is shown in FIG. 12 and subjected to the test.
Figure 17:
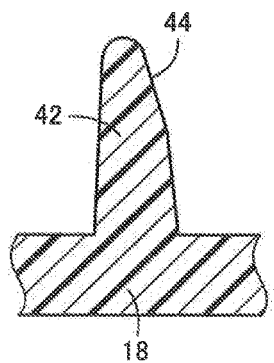
FIG. 17 is a longitudinal section taken along line XVII-XVII and viewed in the direction of arrows XVII-XVII in FIG. 16.
Figure 18:
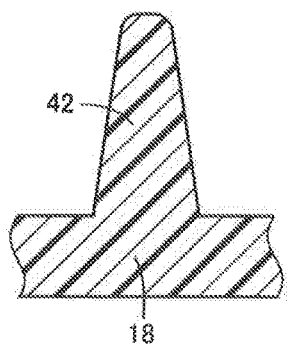
FIG. 18 is a longitudinal section taken along line XVIII-XVIII and viewed in the direction of arrows XVIII-XVIII in FIG. 16.
Figure 19:
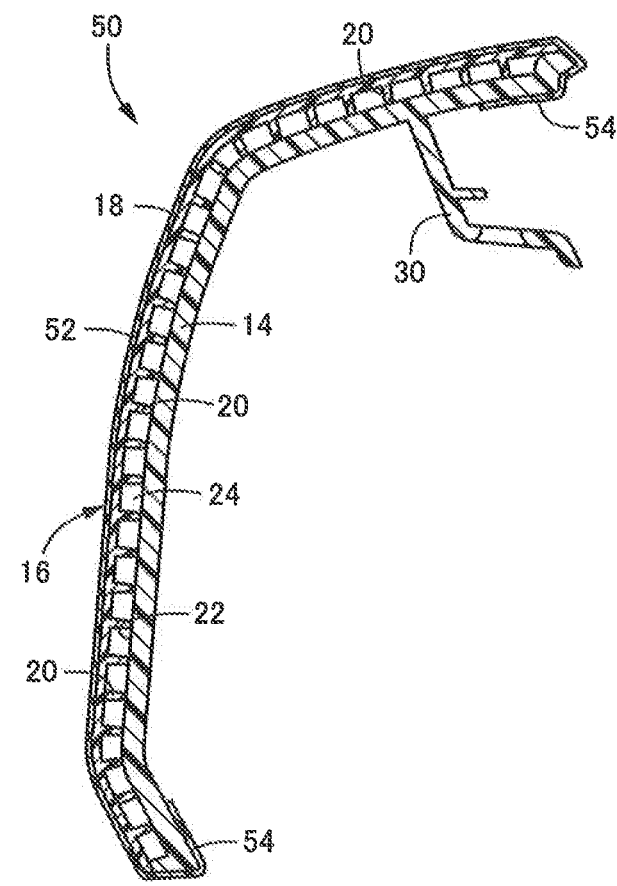
FIG. 19 is a sectional view corresponding to FIG. 4 and is a view for explaining an embodiment in which a surface member is fixed to a surface layer member.

On the other hand, for example, in the case of perpendicular fine protrusions 42 standing substantially perpendicularly to the plate portion 18 as shown in FIGS. 16 to 18, each perpendicular fine protrusion 42 is merely compressively deformed in the axial direction as sequentially shown in FIGS. 35A and 35B, which may not provide an appropriate soft feel FIG. 16 is a plan view of the perpendicular fine protrusion 42, FIG. 17 is a longitudinal section taken along line XVII-XVII and viewed in the direction of arrows XVII-XVII in FIG. 16, and FIG. 18 is a longitudinal section taken along line XVIII-XVIII and viewed in the direction of arrows XVIII-XVIII in FIG. 16. The perpendicular fine protrusion 42 has a plate shape with a substantially rectangular transverse section like the fine protrusion 20, and has a greatly tilted surface 44 tilted at a large tilt angle so as to facilitate flexural (buckling) deformation of the perpendicular fine protrusion 42 toward a side opposite to the greatly tilted surface 44. However, since the contact center Q overlaps the base end portion in the planar direction of the front surface 22 in the initial state shown in FIG. 35A, slight friction between the perpendicular fine protrusion 42 and the front surface 22 hinders flexural deformation of the perpendicular fine protrusion 42 and causes simple compressive deformation of the perpendicular fine protrusion 42. Even if the perpendicular fine protrusion 42 is flexurally deformed toward the side opposite to the greatly tilted surface 44 as sequentially shown in FIGS. 35A and 35C, slip-stick, a phenomenon that surfaces alternate between sliding on each other and sticking to each other, may occur in the case where the friction between the perpendicular fine protrusion 42 and the greatly tilted surface 44 is relatively large or Young's modulus of the surface layer member 16 is relatively small, providing a strange tactile feel.

On the other hand, the multiplicity of fine protrusions 20 are disposed in such an attitude that the fine protrusions 20 are to be bent in opposite directions alternately in a circumferential direction about the centerline of each polygon, namely each regular hexagon, of the grid pattern 34. Specifically, of the six fine protrusions 20 placed on the respective sides of the regular hexagon, the three fine protrusions 20 placed on every other side of the regular hexagon in the circumferential direction are disposed in such an attitude that they are tilted inward of the regular hexagon, and the remaining three fine protrusions 20 placed therebetween are disposed in such an attitude that they are tilted outward of the regular hexagon. In other words, the six fine protrusions 20 placed on the respective sides of the regular hexagon are disposed in such an attitude that the longitudinal direction of the transverse section of each fine protrusion 20 is parallel to a corresponding one of the sides of the regular hexagon and the six fine protrusions 20 are bent alternately in opposite directions in the regular hexagon. Each adjacent pair of the fine protrusions 20 are therefore rotated by 120° with respect to each other, so that the bending directions of the respective two adjacent fine protrusions 20 are shifted by 120° from each other. The attitudes of the six fine protrusions 20 placed on the respective six sides of each hexagon are common in an entire area of the grid pattern 34, and the manners of the flexural deformation of the six fine protrusions 20 placed on the respective six sides of each hexagon are also common in the entire area of the grid pattern 34.

As described above, in the present embodiment, the multiplicity of fine protrusions 20 are formed so as to be interspersed all over the plate portion 18, and the neutral plane S of each fine protrusion 20 is tilted at the tilt angle α with respect to the normal direction O such that the contact center Q does not overlap the base end portion in the planar direction of the front surface 22. This increases the moment that is applied to the fine protrusions 20 when the pressing load F is applied, whereby the fine protrusions 20 are more easily flexurally deformed in their tilt directions. This suppresses such simple compressive deformation of the fine protrusions 20 in the axial direction as shown in FIG. 35(b) and improves the soft feel (cushioning properties) and also suppresses stick-slip (see FIG. 35(c)) that is caused by the friction between the front surface 22 and the fine protrusions 20 etc., thereby providing a smooth, stable soft feel.

The bending (buckling) direction of each fine protrusion 20 can be controlled by its tilt direction, and the deformation manner (the bending direction etc.) in which each fine protrusion 20 is elastically deformed is stable. This suppresses variation in tactile feel at the time the plate portion 18 is pressed with a finger or a hand.

Each fine protrusion 20 has a plate shape, and the neutral plane S in the thickness direction of the plate shape is tilted at the predetermined tilt angle α with respect to the normal direction O along the entire length from the base end portion to the distal end portion. This more reliably facilitates flexural deformation of the fine protrusions 20 in their tilt directions, providing a smoother, more stable soft feel and suppressing variation in tactile feel at the time the plate portion 18 is pressed with a finger or a hand.

Since the tilt angle α is in the range of 15° to 25°, and in the present embodiment, α≈20°, degradation in mold release properties due to undercuts is suppressed, and smooth, stable flexural deformation can be implemented by the tilt.

The bending directions of the multiplicity of fine protrusions 20 can be controlled by their tilt directions. Accordingly, arranging the fine protrusions 20 in a manner avoiding interference of the protrusions 20 with each other upon their flexural deformation allows the fine protrusions 20 to be arranged as densely as possible. This can suppress variation in tactile feel due to the presence and absence of the fine protrusions 20 and can reliably provide a predetermined soft feel by elastic deformation of the fine protrusions 20.

The fine protrusions 20 are arranged in the grid pattern 34 in which a multiplicity of polygons continuously adjoin each other, and are positioned in respective positions defining the respective sides of the polygons. The multiplicity of fine protrusions 20 are thus arranged in a given arrangement pattern, which suppresses variation in tactile feel at the time the plate portion 18 is pressed with a finger or a hand.

The multiplicity of fine protrusions 20 have the same shape and are flexurally deformed in the given directions about the axis. The attitudes of the fine protrusions 20 are shifted from each other by a predetermined angle (in the embodiment, 120°) so as to correspond to the sides in the grid pattern 34, and the bending directions of the fine protrusions 20 are made different accordingly. Therefore, the fine protrusions 20 support each other, providing an appropriate rigid feel (not too-soft feel). This rigid feel together with the soft feel provided by elastic deformation of the fine protrusions 20 can provide a further improved tactile feel.

The grid pattern 34 is a honeycomb pattern that is a succession of the polygons in the form of regular hexagons of the same size, and the attitudes of the fine protrusions 20 having an elongated (oblong rectangular) shape in the transverse section are shifted from each other by 120°. This suppresses anisotropy of elastic deformation that is caused by the pressing load F, and provides a relatively uniform tactile feel even if the pressing load F is applied in an oblique direction.

The multiplicity of fine protrusions 20 are arranged one by one on each side of the regular hexagons forming the grid pattern 34, and are disposed in such an attitude that the fine protrusions 20 are to be bent in opposite directions alternately in a circumferential direction about the centerline of each regular hexagon of the grid pattern 34. Despite that the fine protrusions 20 are flexurally deformed in the given directions, the deformation manner of the fine protrusions 20 of each regular hexagon is therefore substantially the same in the entire area of the grid pattern 34, whereby a uniform tactile feel can be provided.

In the present embodiment, the ornament 10 has a two-layer structure in which only the surface layer member 16 is superposed on the base member 14 and fixedly attached thereto. The ornament 10 therefore has a simple structure and can be manufactured at low cost.

In the present embodiment, the multiplicity of fine protrusions 20 have a simple oblong rectangular shape in transverse section. For example, this simplifies the structure of a mold for molding the surface layer member 16 having the fine protrusions 20, whereby manufacturing cost is reduced, and the ornament 10 can be configured at low cost.

Figure 11:
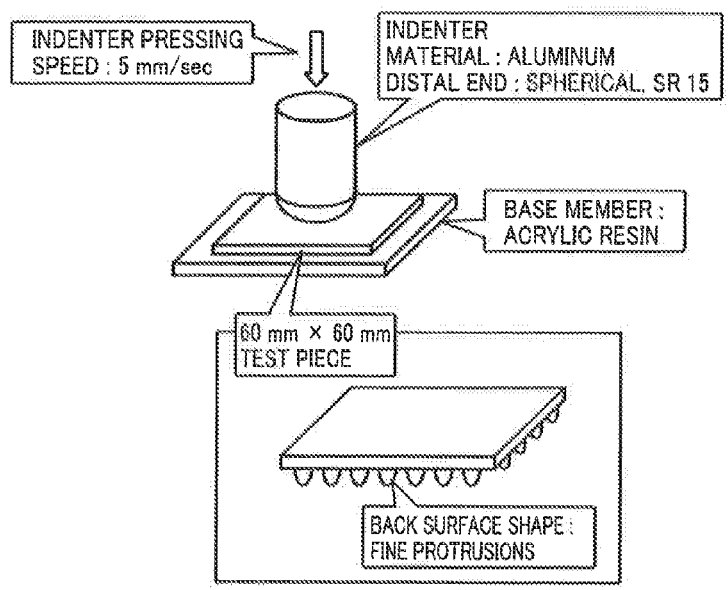
FIG. 11 is a view showing a test method that is used to examine a relationship between a reaction force of the fine protrusion and a stroke.

The result of examination on reaction force-stroke characteristics by the multiplicity of fine protrusions 20 will be described. FIG. 11 is a diagram showing a test method that is used to examine the relationship between the reaction force and the stroke by using a flat surface layer member 16 having the multiplicity of fine protrusions 20 as a test piece. The surface layer member 16 has a size of 60 mm by 60 mm and is made of TPO (olefinic thermoplastic elastomer), and the multiplicity of fine protrusions 20 are arranged in a honeycomb grid pattern 34 as in the embodiment. The surface layer member 16 was placed on an acrylic base member in such an attitude that the fine protrusions 20 faced downward, and an aluminum indenter whose distal end has a spherical radius of 15 mm was pressed at 5 mm/sec to measure the relationship between the reaction force and the stroke by using a load cell connected to the indenter.

Figure 12:
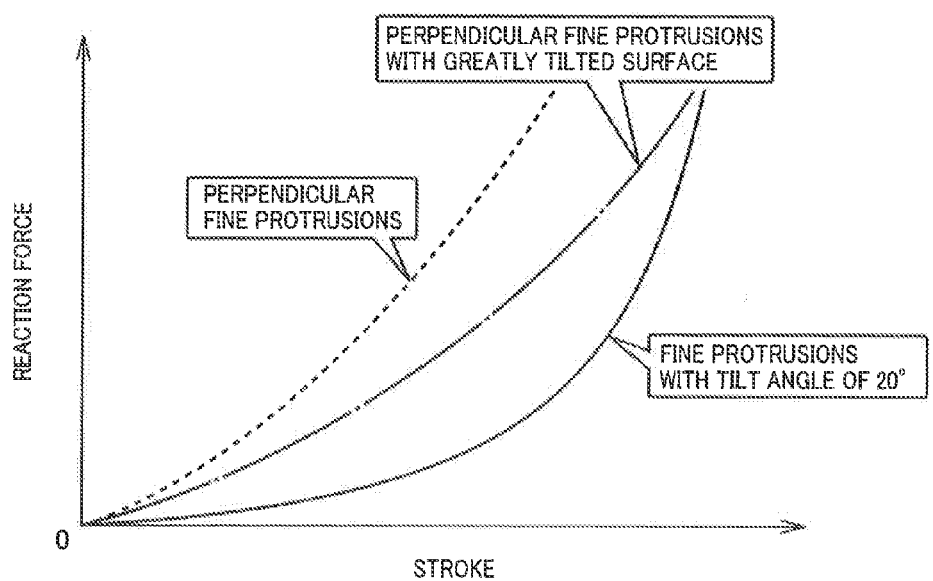
FIG. 12 is a view showing results of tests conducted in accordance with the test method of FIG. 11, for examining reaction force-stroke characteristics of three kinds of fine protrusions.
Figure 13:
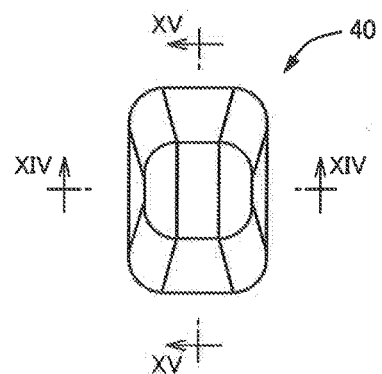
FIG. 13 is a plan view showing, by way of example, a perpendicular fine protrusion as a comparative product, which is shown in FIG. 12 and subjected to the test.
Figure 14:
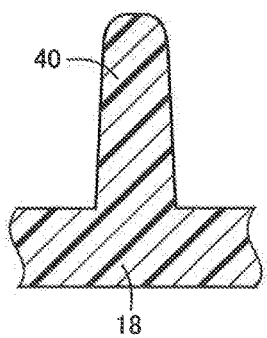
FIG. 14 is a longitudinal section taken along line XIV-XIV and viewed in the direction of arrows XIV-XIV in FIG. 13.
Figure 15:
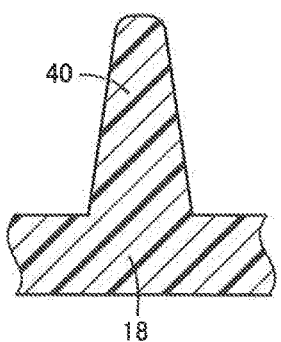
FIG. 15 is a longitudinal section taken along line XV-XV and viewed in the direction of arrows XV-XV in FIG. 13.

Solid line in FIG. 12 represents reaction force-stroke characteristics obtained by the pressing test. Alternate long and short dash line in FIG. 12 represents reaction force-stroke characteristics of a comparative product having the perpendicular fine protrusions 42 shown in FIGS. 16 to 18 instead of the fine protrusions 20. Dashed line in FIG. 12 represents reaction force-stroke characteristics of a comparative product having perpendicular fine protrusions 40 shown in FIGS. 13 to 15. FIG. 13 is a plan view of the perpendicular fine protrusion 40, FIG. 14 is a longitudinal section taken along line XIV-XIV and viewed in the direction of arrows XIV-XIV in FIG. 13, and FIG. 15 is a longitudinal section taken along line XV-XV and viewed in the direction of arrows XV-XV in FIG. 13. The perpendicular fine protrusion 40 is different from the perpendicular fine protrusion 42 in that the perpendicular fine protrusion 40 does not have the greatly tilted surface 44. The perpendicular fine protrusion 40 thus has a symmetrical shape in both longitudinal sections of FIGS. 14 and 15. As can be seen from the characteristics shown in FIG. 12, in the perpendicular fine protrusion 42 having the greatly tilted surface 44, the reaction force increases more gently with an increase in stroke as compared to the symmetrical perpendicular fine protrusion 40 that does not have the greatly tilted surface 44, thereby providing an improved soft feel. According to the fine protrusion 20 of the present embodiment in which the neutral plane S is tilted at the tilt angle α(=20°), the reaction force increases even more gently as compared to the perpendicular fine protrusion 42, thereby providing a further improved soft feel.

Other embodiments of the present invention will be described. In the following embodiments, substantially the same portions as those of the above embodiment are denoted with the same reference characters, and detailed description thereof will be omitted.

An ornament 50 of FIG. 39 is different from the ornament 10 in that a surface member 52 is firmly fixed to the front surface of the surface layer member 16, namely one of opposite surfaces of the plate portion 18, which is remote from the fine protrusions 20 that are formed on the plate portion 18, so that the ornament 50 includes the surface member 52, the surface layer member 16 and the plate-shaped base member 14 to constitute a three-layer structure as a whole. For example, the surface member 52 is made of woven fabric, nonwoven fabric, knitted fabric, vinyl chloride, a flexible film, etc. Molding the surface member 52 integrally with the surface layer member 16 allows the surface member 52 to be molded simultaneously with the surface layer member 16 so as to be firmly fixed to the front surface of the surface layer member 16. An outer peripheral terminal portion 54 of the surface member 52 wraps the outer peripheral edge portion of the base member 14, and is latched and held by the latch protrusions 28. With the ornament 50 being fixedly attached to the vehicle door trim 12, the terminal portion 54 is pressed against the outer peripheral edge portion of the base member 14 by the holding portions 32. The surface layer member 16 together with the surface member 52 is thus fixedly attached to the base member 14.

Such an ornament 50 has functions and effects which are similar to those of the ornament 10. Moreover, since the surface layer member 16 is covered by the surface member 52, sink marks, flashing, etc., if any, on the above-described one of the opposite surfaces of the plate portion 18 of the surface layer member 16, which is remote the fine protrusions 20 that are formed on the plate portion 18 are not exposed to the outside, and scratches on the surface layer member 16 are prevented. This expands the choice of resin materials for the surface layer member 16 and increases flexibility in design such as the shape of the fine protrusions 20 etc. which relates to the tactile feel. The tactile feel can thus be adjusted more easily and appropriately.

Figure 20:
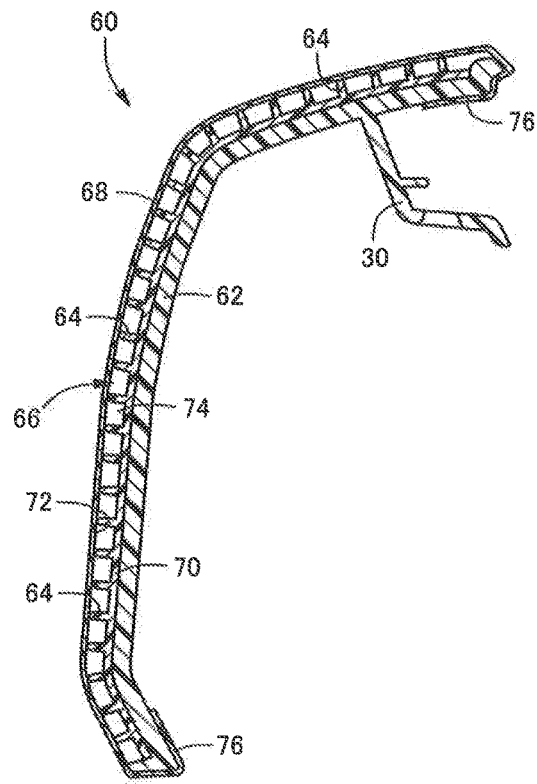
FIG. 20 is a sectional view corresponding to FIG. 4 and is a view for explaining an embodiment in which the first member is a surface layer member while the second member is fixed to a base member.

In an ornament 60 of FIG. 20, a cushioning member 66 having a multiplicity of fine protrusions 64 is provided on the front surface of a plate-shaped base member 62, and a surface layer member 68 is attached so as to be superposed on the fine protrusion 64 side of the cushioning member 66. Like the base member 14, the base member 62 is made of a relatively hard synthetic resin material, and the latch protrusions 28 and the attachment engagement portions 30 are formed integrally with the base member 62 on the back surface of the base member 62. The cushioning member 66 corresponds to the second member. The cushioning member 66 is made of an elastically deformable synthetic resin material like the surface layer member 16, and has a plate portion 70 that is firmly fixed to the front surface of the base member 62 so as to be in close contact therewith, and a multiplicity of fine protrusions 64 are formed integrally with the plate portion 70. For example, the fine protrusions 64 are configured similarly to the fine protrusions 20. The fine protrusions 64 are provided so as to protrude from the plate portion 70 toward the surface layer member 68 so that a space 74 is defined between a back surface 72 of the surface layer member 68 and the plate portion 70, and the distal ends of the fine protrusions 64 are in close contact with the back surface 72. The back surface 72 corresponds to the mating surface. The surface layer member 68 corresponds to the first member, and in the present embodiment, is made of a relatively soft synthetic resin material like the surface layer member 16. An outer peripheral terminal portion 76 of the surface layer member 68 wraps the outer peripheral edge portion of the base member 62, and is latched and held by the latch protrusions 28 (not shown). With the ornament 60 being fixedly attached to the vehicle door trim 12, the terminal portion 76 is pressed against the outer peripheral edge portion of the base member 62 by the holding portions 32. The surface member 52 may further be provided on the surface layer member 68.

When the surface layer member 68 of such an ornament 60 is pressed with a finger or a hand, the back surface 72 of the surface layer member 68 is pressed against the distal ends of the fine protrusions 64 of the cushioning member 66. The fine protrusions 64 are therefore elastically deformed, providing an excellent tactile feel. The ornament 60 thus has effects similar to those of the ornament 10. Moreover, since the cushioning member 66 having the fine protrusions 64 is covered by the surface layer member 68 and the plate portion 70 of the cushioning member 66 is fixed to the base member 62, sink marks, flashing, etc., if any, on a surface of the plate portion 70 of the cushioning member 66, which is remote from the fine protrusions 64 that are formed on the plate portion 70 are not exposed to the outside. This expands the choice of resin materials for the cushioning member 66 and increases flexibility in design such as the shape of the fine protrusions 64 etc. which relates to the tactile feel. The tactile feel can thus be adjusted more easily and appropriately.

Figure 21:
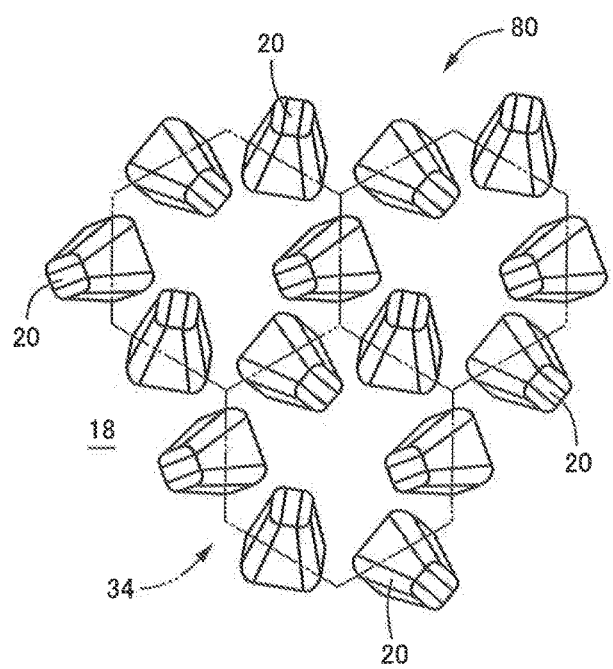
FIG. 21 is a plan view showing a multiplicity of fine protrusions and is a view for explaining another embodiment in which the fine protrusions are arranged with different attitudes.
Figure 22A:
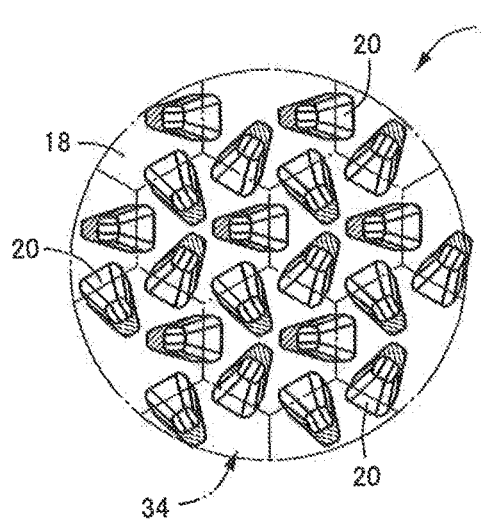
FIGS. 22A and 22B are views showing, in comparison with the embodiment of FIG. 6, a region (shaded region) upon elastic deformation of each fine protrusion in the embodiment of FIG. 21.
Figure 22B:
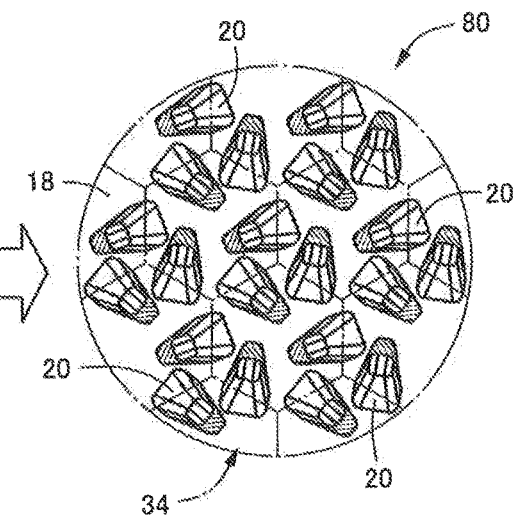

A surface layer member 80 of FIG. 21 is different from the surface layer member 16 in the attitude in which the fine protrusions 20 are disposed on the plate portion 18. That is, in the present embodiment, the fine protrusions 20 are tilted at a predetermined angle (e.g., in the range of about 10° to 30°, and in the embodiment, about 20°) with respect to the sides of the regular hexagons of the grid pattern 34. In the case where the fine protrusions 20 are disposed parallel to the sides of the regular hexagons as shown in FIG. 6, the fine protrusions 20 buckle toward the centers of the regular hexagons as shown by shaded regions in FIG. 22A when flexurally deformed by the pressing load F. Accordingly, the height dimension H of the fine protrusions 20 is limited in order to avoid interference. However, tilting the fine protrusions 20 as shown in FIG. 21 shifts the buckling directions of the fine protrusions 20 from each other as shown by shaded regions in FIG. 22B. The fine protrusions 20 are therefore less likely to interfere with each other. This allows the height dimension H to be increased accordingly so that the soft feel can be improved.

Figure 23:
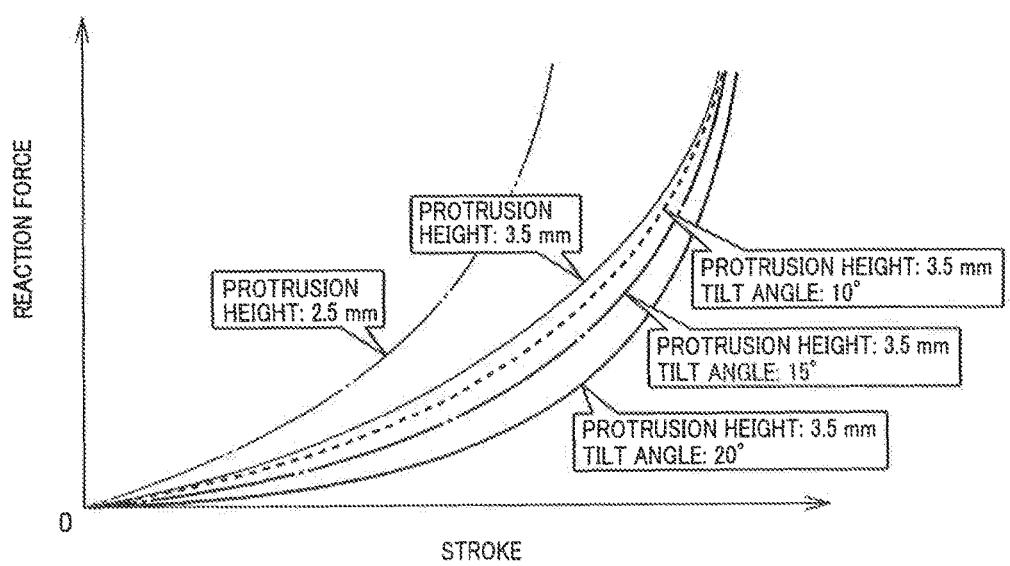
FIG. 23 is a view showing results of tests conducted in accordance with the test method of FIG. 11, for examining reaction force-stroke characteristics of two kinds of fine protrusions that are different in terms of protrusion height and three kinds of fine protrusions that are different in terms of tilt angle.

FIG. 23 is a diagram showing the result of examination on reaction force-stroke characteristics according to the test method in FIG. 11 which was conducted for the perpendicular fine protrusions 42 having the height dimension H of 2.5 mm and 3.5 mm. As can be seen from FIG. 23, in the case where the height dimension H is 3.5 mm, the reaction force is smaller than in the case where the height dimension H is 2.5 mm, whereby an excellent soft feel is provided. Regarding the fine protrusions 20 tilted at the predetermined tilt angle α as well, the soft feel is improved as the height dimension H increases.

FIG. 23 also shows the result of examination on reaction force-stroke characteristics obtained for the fine protrusions 20 having the height dimension H of 3.5 mm and tilted at different tilt angles α. The result shows that, for the three tilt angles α of 10°, 15° and 20°, the reaction force is smaller and the soft feel is improved as the tilt angle α increases, even if the height dimension H is the same. Even if the height dimension H is the same, the length by which the fine protrusions 20 protrude increases as the tilt angle α increases. This also increases the soft feel as the moment in the bending direction at the time the pressing load F is applied is increased.

Figure 24A:
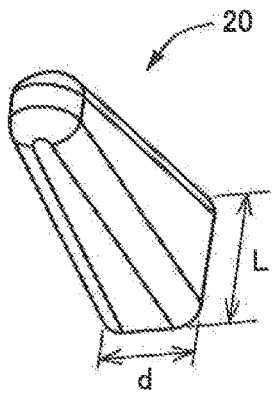
FIGS. 24A and 24B are views for explaining an example in which an aspect ratio is different from that in the embodiment of FIG. 6.
Figure 24B:
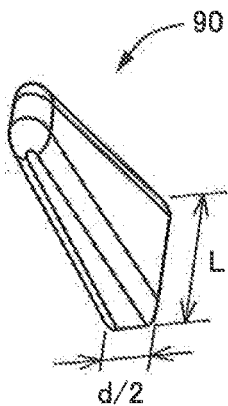

FIG. 24 shows an example in which the aspect ratio is changed to improve the soft feel FIG. 24A is a perspective view of the fine protrusion 20, and a fine protrusion 90 in FIG. 24B has the same lateral dimension L as the fine protrusion 20 and has a thickness dimension d/2 that is half the thickness dimension of the fine protrusion 20. In this case, since the thickness dimension of the fine protrusion 90 is half that of the fine protrusion 20, the fine protrusion 90 is more easily flexurally deformed in the thickness direction, and the soft feel is improved.

Figure 25:
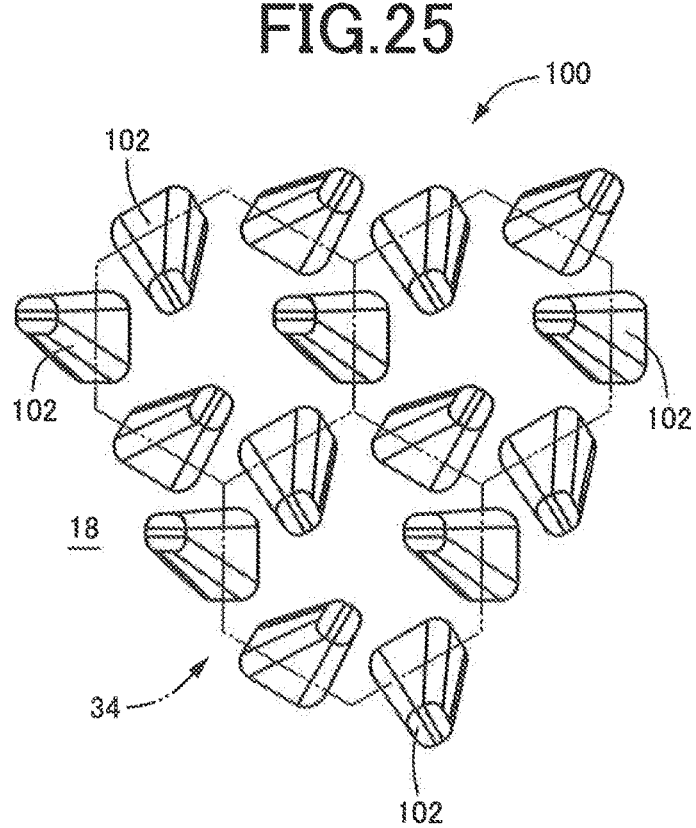
FIG. 25 is a view for explaining still another embodiment of the present invention in which each fine protrusion has a shape asymmetrical in a lateral direction of the fine protrusion, and is a plan view showing the multiplicity of fine protrusions.
Figure 26:
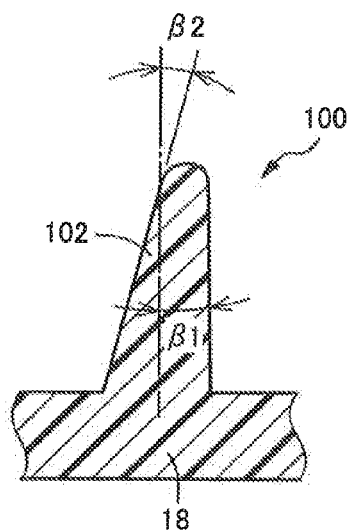
FIG. 26 is a longitudinal sectional view corresponding to FIG. 8 and showing a cross section of the fine protrusion of FIG. 25 which is parallel to the lateral direction.
Figure 27:
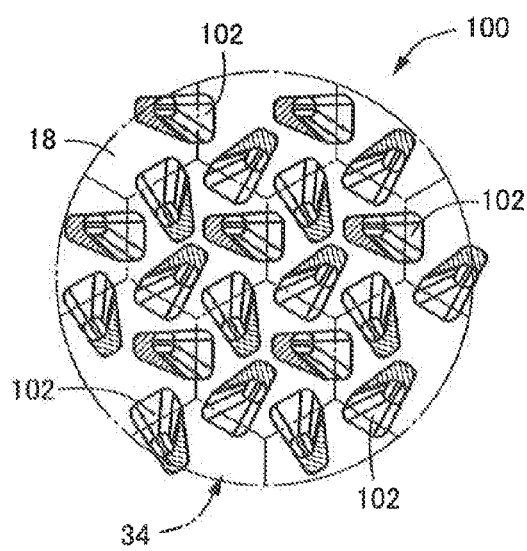
FIG. 27 is a view showing a region (shaded region) upon elastic deformation of each fine protrusion in the embodiment of FIG. 25.

A surface layer member 100 in FIG. 25 is different from the surface layer member 16 in terms of the shape of fine protrusions 102. That is, the fine protrusions 102 of the present embodiment have the same shape as the fine protrusions 20 in a longitudinal section along the thickness direction which corresponds to FIG. 7. However, as shown in FIG. 26, the fine protrusions 102 of the present embodiment have an asymmetrical shape in a longitudinal section along the lateral direction which corresponds to FIG. 8. Specifically, tilt angles β1, β2 of both side surfaces in the lateral direction are different from each other, and in the present embodiment, β1≈1° and β2≈15°. The buckling directions in which such fine protrusions 102 buckle when flexurally deformed by the pressing load F are shifted from each other as shown by shaded regions in FIG. 27. Accordingly, the fine protrusions 102 are less likely to interfere with each other. The height dimension H can therefore be increased accordingly, and the soft feel can be improved. That is, although the fine protrusions 102 are disposed in such an attitude that the longitudinal directions of their oblong rectangular transverse sections are parallel to the sides of the regular hexagons, the surface layer member 100 can provide functions and effects which are similar to those of the surface layer member 80 in which the fine protrusions 20 are disposed in such an attitude that they are tilted with respect to the sides of the regular hexagons as shown in FIG. 21.

Figure 28:
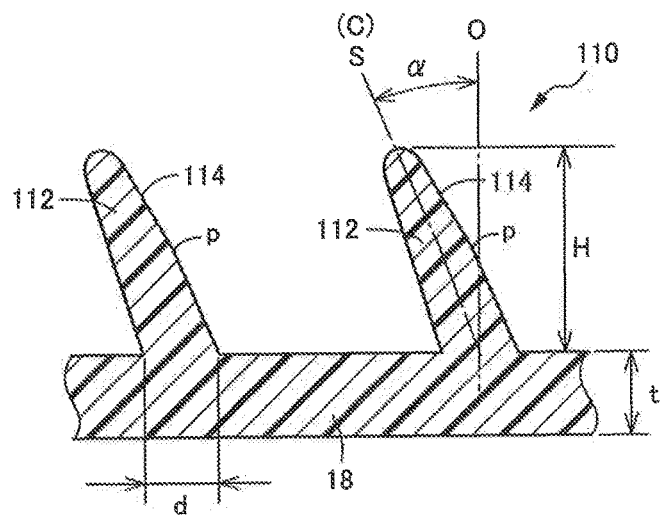
FIG. 28 is a longitudinal sectional view corresponding to FIG. 7 and is a view for explaining still another embodiment of the present invention.
Figure 29:
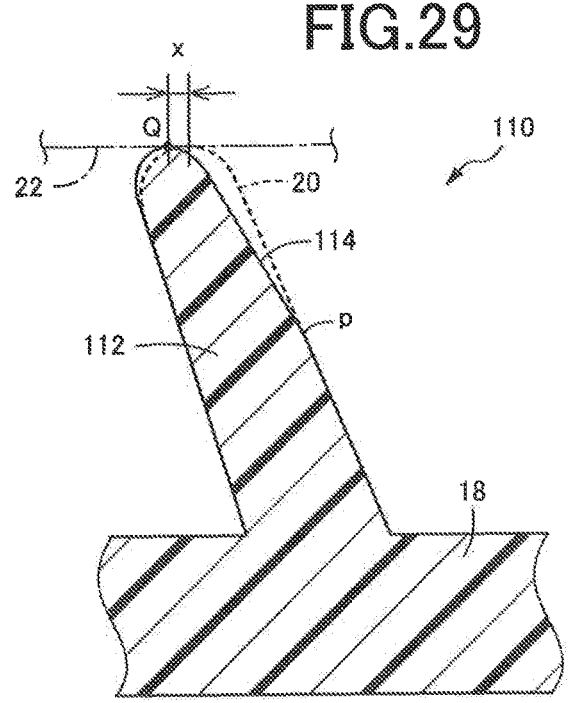
FIG. 29 is a longitudinal sectional view showing, in further enlargement, the fine protrusions of FIG. 28.
Figure 30:
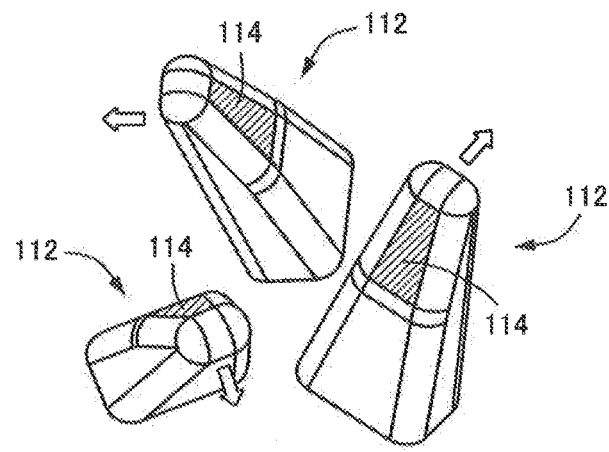
FIG. 30 is a perspective view of the fine protrusions of FIG. 28 wherein white arrows indicate bending directions of the protrusions.
Figure 31:
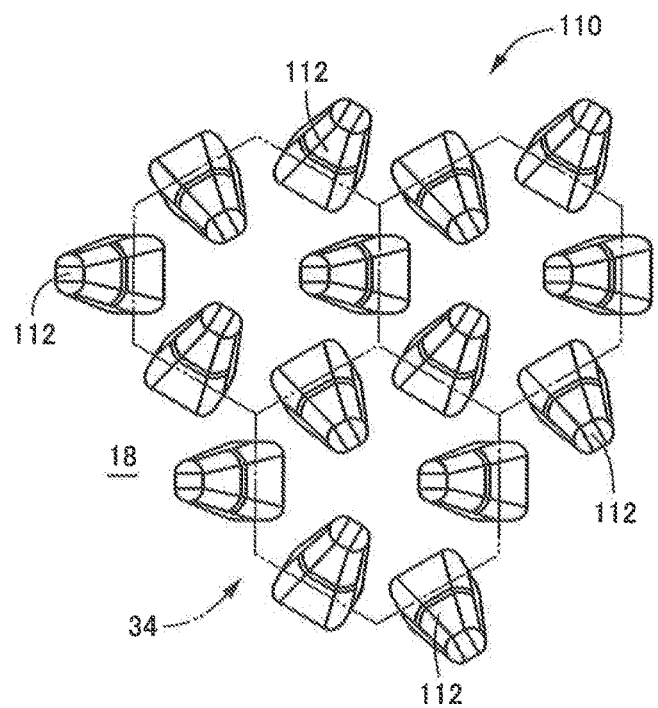
FIG. 31 is a plan view showing the multiplicity of fine protrusions in the embodiment of FIG. 28.

A surface layer member 110 of FIG. 28 is different from the surface layer member 16 in terms of the shape of fine protrusions 112. FIG. 28 is a diagram corresponding to FIG. 7, showing a longitudinal section along the thickness direction of the fine protrusions 112. One of the side surfaces in the thickness direction of the fine protrusion 112, namely the side surface of the fine protrusion 112 which is opposite to the side surface located in the tilt direction, is not tilted at a constant tilt angle. The fine protrusion 112 has a greatly tilted surface 114 on the distal end side of an intermediate point p, and the greatly tilted surface 114 is tilted at a larger tilt angle than a surface on the base end side of the intermediate point p. The tilt angle α of the neutral plane S therefore changes accordingly near the intermediate point p, so that the tilt angle α is larger on the distal end side than on the base end side. That is, the base end side of the intermediate point p of the fine protrusion 112 is the same as the fine protrusion 20, but the tilt angle α on the distal end side of the intermediate point p is larger than that in the fine protrusion 20. As can be seen from an enlarged view of FIG. 29, the center Q of contact between the fine protrusion 112 and the front surface 22 of the base member 14 is shifted by a dimension x. This further increases the moment that is generated when the pressing load F is applied, and facilitates flexural deformation of the fine protrusion 112, whereby the soft feel can further be unproved. In this case, since the tilt angle of the side surface in the tilt direction of the fine protrusion 112 is the same as that in the fine protrusion 20 up to the distal end portion, the moment can be increased and the soft feel can be improved without degrading mold release properties due to undercuts. FIG. 30 is a perspective view of the plurality of fine protrusions 112, which corresponds to FIG. 9. Shaded regions in FIG. 30 represent the greatly tilted surfaces 114. FIG. 31 is a plan view of the plate portion 18 having the multiplicity of fine protrusions 112.

Figure 32:
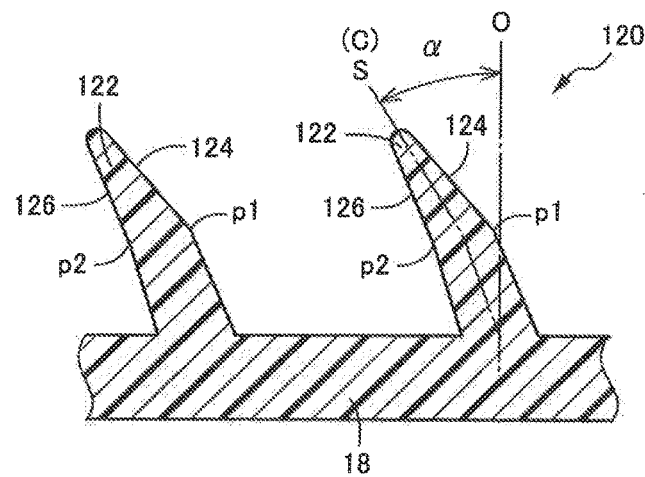
FIG. 32 is a longitudinal sectional view corresponding to FIG. 28 and is a view for explaining still another embodiment of the present invention.

FIG. 32 is a sectional view corresponding to FIG. 28. In fine protrusions 122 of a surface layer member 120, neither of the side surfaces in the thickness direction is tilted at a constant tilt angle. The fine protrusion 122 has greatly tilted surfaces 124, 126 on the distal end side of intermediate points p1, p2, and the greatly tilted surfaces 124, 126 are tilted at a larger tilt angle than surfaces on the base end side of the intermediate points p1, p2. The tilt angle α of the neutral plane S therefore changes accordingly near the intermediate points p1, p2, so that the tilt angle α is larger on the distal end side than on the base end side. Unlike the fine protrusion 112 in FIG. 28, the fine protrusion 122 has the greatly tilted surfaces 124, 126 on both side surfaces, which further increases the tilt angle α on the distal end side and increases the dimension x by which the contact center Q is shifted. This further increases the moment that is generated when the pressing load F is applied, and facilitates flexural deformation of the fine protrusion 112, whereby the soft feel can further be improved.

Figure 33:
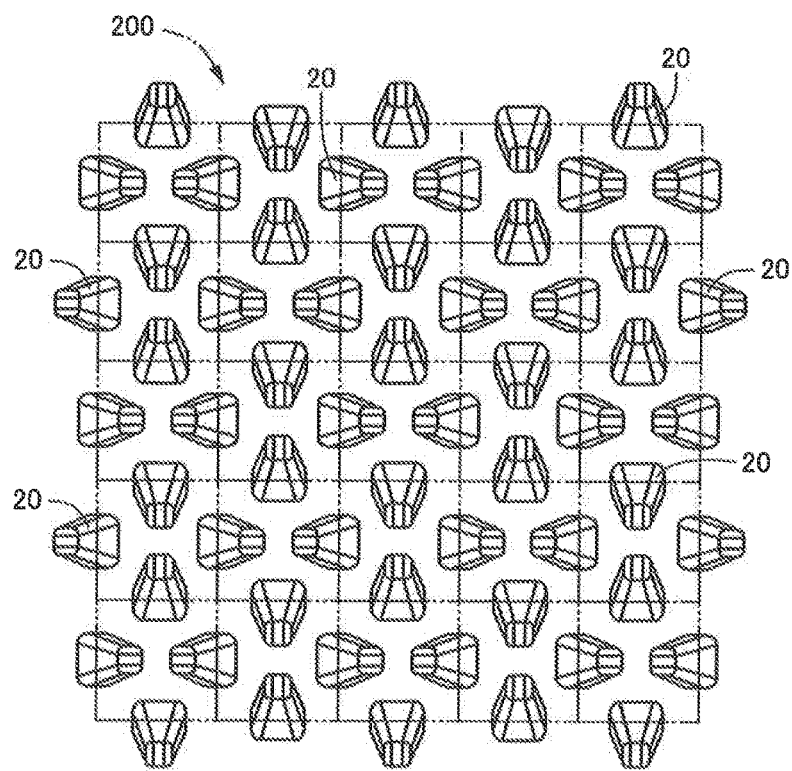
FIG. 33 is a plan view for explaining an embodiment in which the multiplicity of protrusions are arranged in a manner defining a grid pattern that is a succession of squares.

FIG. 33 shows the case where the fine protrusions 20 are arranged in a different pattern from that in FIG. 6. In this case, the multiplicity of fine protrusions 20 are arranged in a grid pattern 200 of a multiplicity of the same squares. The fine protrusions 20 are arranged one by one on each side of the squares defining the grid pattern 200 and are disposed in such an attitude that the longitudinal direction of the oblong rectangular transverse section of each fine protrusion 20 is parallel to a corresponding one of the sides of the squares. The fine protrusions 20 are disposed also in such an attitude that the fine protrusions 20 are tilted in opposite directions alternately in a circumferential direction around the centerline of each square of the grid pattern 200. Despite that the fine protrusions 20 are flexurally deformed in the given direction, the deformation manner of the fine protrusions 20 of each square is therefore substantially the same in the entire area of the grid pattern 200, whereby a uniform tactile feel can be provided. The present embodiment thus has effects similar to those of the embodiment of FIG. 6. Although the present embodiment is described with respect to the grid pattern 200 of squares, the fine protrusions 20 may be arranged in a grid pattern of rhombuses, oblong rectangles, or parallelograms.

Figure 34:
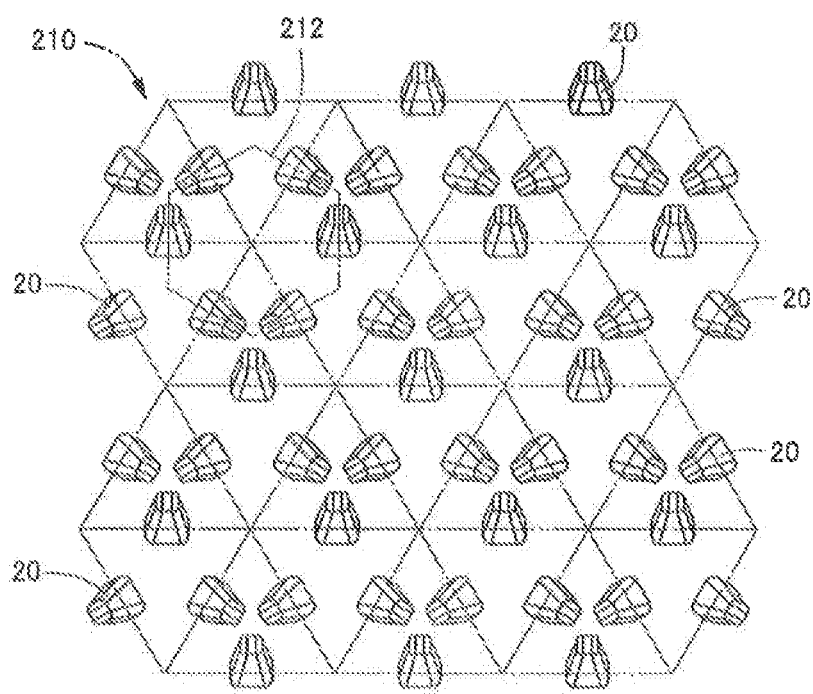
FIG. 34 is a plan view for explaining an embodiment in which the multiplicity of protrusions are arranged in a manner defining a grid pattern that is a succession of equilateral triangles.

FIG. 34 shows the case where the fine protrusions 20 are arranged in a different manner from that in FIG. 6. In this case, the multiplicity of fine protrusions 20 are arranged in a grid pattern 210 of a multiplicity of the same equilateral triangles. The fine protrusions 20 are arranged one by one on each side of the equilateral triangles forming the grid pattern 210 and are disposed in such an attitude that the longitudinal direction of the rectangular transverse section of each fine protrusion 20 is parallel to a corresponding one of the sides of the equilateral triangles. In this case as well, the attitudes of the multiplicity of fine protrusions 20 arranged in the grid pattern 210 are shifted from each other by a predetermined angle. Therefore, the fine protrusions 20 support each other, providing an appropriate rigid feel. This rigid feel together with the soft feel provided by elastic deformation of the fine protrusions 20 can provide an excellent tactile feel. The present embodiment thus has functions and effects which are similar to those of the embodiment of FIG. 6.

The grid pattern 210 of FIG. 34 may be modified to a grid pattern that is a succession of regular hexagons 212. In this case, the fine protrusions 20 are disposed in such an attitude that the longitudinal direction of the oblong rectangular transverse section of each fine protrusion 20 is perpendicular to a corresponding one of the sides of the regular hexagons 212. The grid pattern 34 of FIG. 6(b) may be modified to a grid pattern that is a succession of equilateral triangles. The grid pattern 200 of FIG. 33 may be modified to a grid pattern of squares in which the squares are shifted by half the pitch so that the fine protrusions 20 are disposed on the respective sides of the squares in such an attitude that the longitudinal direction of the oblong rectangular transverse section of each fine protrusion 20 is perpendicular to a corresponding one of the sides of the squares.

The embodiments of FIGS. 21 to 34 are described as modifications of the fine protrusions 20 of the surface layer member 16 shown in FIG. 6. However, the fine protrusions 64 of the cushioning member 66 in FIG. 20 may also be modified similarly.

Although the embodiments of the present invention are described above in detail based on the drawings, the embodiments are shown by way of example only, and the present invention can be embodied in various modified or improved forms based on the knowledge of those skilled in the art.

DESCRIPTION OF REFERENCE SIGNS 10, 50, 60: ornament (laminated composite interior part, plate-shaped panel) 14: base member (first member) 16, 80, 100, 110, 120: surface layer member (second member) 18, 70: plate portion 20, 64, 90, 102, 112, 122: small protrusion (protrusion) 22: front surface (mating surface) 24, 74: space 34, 200, 210: grid pattern 52: surface member 66: cushion member (second member) 68: surface layer member (first member) 72: back surface (mating surface) 212: regular hexagon (polygon) α: tilt angle S: neutral plane C: centerline Q: contact center O: normal direction

The invention claimed is:

1. A laminated composite interior part comprising:
a first member having a mating surface;
a second member which is made of an elastically deformable resin material, and which has a plate portion substantially parallel to the mating surface, the plate portion being provided with a multiplicity of protrusions which are formed integrally with the plate portion and which protrude toward the mating surface such that the plate portion and the mating surface cooperate to define a space between the plate portion and the mating surface, the second member being placed on the first member with the protrusions being in contact with the mating surface;
the laminated composite interior part having cushioning properties and thus a predetermined tactile feel provided by elastic deformation of the protrusions, which is to be caused as distal ends of the protrusions are pressed against the mating surface;
the multiplicity of protrusions being identical with one another in shape, a base end portion of each of the protrusions and a center of contact between the each of the protrusions and the mating surface being offset from each other so as not to overlap each other in a planar direction of the mating surface, each of the protrusions being flexurally deformed in a given direction about an axis that is determined by a positional relationship between the base end portion of the each of the protrusions and the center of the contact, and the multiplicity of protrusions being interspersed on the plate portion so as to be arranged at predetermined intervals depending on the height of the protrusions so that the protrusions do not interfere with each other when flexurally deformed;

the multiplicity of protrusions being positioned on all sides of a multiplicity of polygons such that at least one of the multiplicity of protrusions is placed on each of the respective sides of the multiplicity of polygons, the polygons having the same shape and size that cooperate to form a grid pattern in which each adjacent pair of the polygons have a common side that is common to the each adjacent pair of the polygons; and the each of the protrusions being positioned on each of the sides of a corresponding one of the polygons in an attitude that causes the each of the protrusions to be bent inward or outward of the corresponding one of the polygons, such that each of the protrusions on the sides of each of the polygons is bent in an opposite direction to a direction in which both adjacent protrusions to the each of the protrusions are bent.

2. The laminated composite interior part according to claim 1, wherein a centerline of each of the protrusions is tilted, at least in a distal end portion of the each of the protrusions which is in contact with the mating surface, with respect to a normal direction normal to the plate portion in the base end portion of the each of the protrusions.

3. The laminated composite interior part according to claim 2, wherein each of the protrusions has a plate shape with an elongated shape in a transverse section thereof parallel to the plate portion, and a neutral plane, which is defined within each of the protrusions in a thickness direction of the plate shape, is tilted with respect to the normal direction along an entire length from the base end portion to the distal end portion of the each of the protrusions.

4. The laminated composite interior part according to claim 1, wherein the grid pattern is a honeycomb pattern that is a succession of the polygons in the form of regular hexagons having a given size.

5. The laminated composite interior part according to claim 1, wherein the laminated composite interior part is a plate-shaped panel part, the second member is a surface layer member, the first member is a plate-shaped base member made of a resin material harder than that of the surface layer member, and a front surface of the base member serves as the mating surface, and the surface layer member is placed on the front surface and is fixedly attached to the base member.

6. The laminated composite interior part according to claim 5, wherein a surface member is firmly fixed to a front surface as one of opposite surfaces of the surface layer member, which is remote from the protrusions that are provided on the plate portion, so that the laminated composite interior part includes the surface member, the surface layer member and the plate-shaped base member, and constitutes a three-layer structure as a whole.

7. The laminated composite interior part according to claim 1, wherein the laminated composite interior part is a plate-shaped panel part, the first member is a plate-shaped surface layer member made of an elastically deformable resin material, and the second member is firmly fixed to a plate-shaped base member such that a back surface as one of opposite surfaces of the second member, which is remote from the protrusions that are provided on the plate portion, is in close contact with the base member.

8. The laminated composite interior part according to claim 1, wherein the grid pattern is a succession of the polygons which are quadrilaterals or hexagons and which are identical with one another.

\* \* \* \* \*